(12) United States Patent
Ashcraft et al.

(10) Patent No.: US 7,849,292 B1
(45) Date of Patent: Dec. 7, 2010

(54) FLAG OPTIMIZATION OF A TRACE

(75) Inventors: Matthew William Ashcraft, Belmont, CA (US); John Gregory Favor, Scotts Valley, CA (US); Christopher Patrick Nelson, Santa Clara, CA (US); Ivan Pavle Radivojevic, San Francisco, CA (US); Joseph Byron Rowlands, Santa Clara, CA (US); Richard Win Thaik, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 562 days.

(21) Appl. No.: 11/941,900

(22) Filed: Nov. 16, 2007

Related U.S. Application Data

(63) Continuation-in-part of application No. 11/781,937, filed on Jul. 23, 2007, which is a continuation-in-part of application No. 11/535,971, filed on Sep. 27, 2006, now Pat. No. 7,546,420, application No. 11/941,900, which is a continuation-in-part of application No. 11/535,972, filed on Sep. 27, 2006, now Pat. No. 7,676,634, application No. 11/941,900, which is a continuation-in-part of application No. 11/535,977, filed on Sep. 27, 2006, now Pat. No. 7,606,975, application No. 11/941,900, which is a continuation-in-part of application No. 11/553,453, filed on Oct. 26, 2006, now Pat. No. 7,587,585, application No. 11/941,900, which is a continuation-in-part of application No. 11/553,455, filed on Oct. 26, 2006, now Pat. No. 7,568,088, application No. 11/941,900, which is a continuation-in-part of application No. 11/591,024, filed on Oct. 31, 2006, now Pat. No. 7,747,822, application No. 11/941,900, which is a continuation-in-part of application No. 11/553,458, filed on Oct. 26, 2006, now Pat. No. 7,568,089.

(60) Provisional application No. 60/889,547, filed on Feb. 13, 2007, provisional application No. 60/721,385, filed on Sep. 28, 2005, provisional application No. 60/730,550, filed on Oct. 26, 2005, provisional application No. 60/730,810, filed on Oct. 27, 2005, provisional application No. 60/731,962, filed on Oct. 31, 2005, provisional application No. 60/732,438, filed on Nov. 1, 2005, provisional application No. 60/832,848, filed on Jul. 23, 2006, provisional application No. 60/832,822, filed on Jul. 23, 2006, provisional application No. 60/862,609, filed on Oct. 24, 2006, provisional application No. 60/731,785, filed on Oct. 31, 2005, provisional application No. 60/866,205, filed on Nov. 16, 2006, provisional application No. 60/866,203, filed on Nov. 16, 2006.

(51) Int. Cl.
*G06F 9/00* (2006.01)
(52) U.S. Cl. .................................... 712/220
(58) Field of Classification Search ................. 712/220, 712/227, 216
See application file for complete search history.

(56) References Cited

U.S. PATENT DOCUMENTS

| | | |
|---|---|---|
| 4,912,707 A | 3/1990 | Kogge et al. |
| 5,381,533 A | 1/1995 | Peleg et al. |
| 5,491,793 A | 2/1996 | Somasundaram et al. |
| 5,568,380 A | 10/1996 | Brodnax et al. |
| 5,632,023 A | 5/1997 | White et al. |
| 5,649,136 A | 7/1997 | Shen et al. |
| 5,944,841 A | 8/1999 | Christie |
| 6,014,742 A | 1/2000 | Krick et al. |
| 6,018,786 A | 1/2000 | Krick et al. |
| 6,031,992 A | 2/2000 | Cmelik et al. |
| 6,055,630 A | 4/2000 | D'Sa et al. |
| 6,073,213 A | 6/2000 | Peled et al. |
| 6,076,144 A | 6/2000 | Peled et al. |
| 6,115,809 A | 9/2000 | Mattson, Jr. et al. |
| 6,170,038 B1 | 1/2001 | Krick et al. |
| 6,185,660 B1 | 2/2001 | Mulla et al. |
| 6,185,675 B1 | 2/2001 | Kranich et al. |
| 6,189,141 B1 | 2/2001 | Benitez et al. |
| 6,205,545 B1 | 3/2001 | Shah et al. |
| 6,216,206 B1 | 4/2001 | Peled et al. |

| | | | |
|---|---|---|---|
| 6,351,844 B1 | 2/2002 | Bala | |
| 6,442,674 B1 | 8/2002 | Lee et al. | |
| 6,449,714 B1 | 9/2002 | Sinharoy | |
| 6,538,997 B1 | 3/2003 | Wang et al. | |
| 6,604,060 B1 | 8/2003 | Ryan et al. | |
| 6,609,189 B1 * | 8/2003 | Kuszmaul et al. | 712/23 |
| 6,671,766 B1 | 12/2003 | Vandenbergh et al. | |
| 6,799,263 B1 | 9/2004 | Morris et al. | |
| 6,826,182 B1 * | 11/2004 | Parthasarathy | 370/390 |
| 6,895,460 B2 | 5/2005 | Desoli et al. | |
| 6,950,924 B2 | 9/2005 | Miller et al. | |
| 6,988,190 B1 | 1/2006 | Park | |
| 7,003,629 B1 | 2/2006 | Alsup | |
| 7,010,648 B2 * | 3/2006 | Kadambi et al. | 711/118 |
| 7,133,969 B2 | 11/2006 | Alsup et al. | |
| 7,136,992 B2 | 11/2006 | Maiyuran et al. | |
| 7,139,902 B2 | 11/2006 | Lee | |
| 7,213,126 B1 | 5/2007 | Smaus et al. | |
| 7,360,024 B2 | 4/2008 | Hironaka et al. | |
| 7,366,875 B2 | 4/2008 | Rasche et al. | |
| 7,415,598 B2 * | 8/2008 | Dos Remedios | 712/220 |
| 7,546,420 B1 | 6/2009 | Shar et al. | |
| 7,594,111 B2 | 9/2009 | Kiriansky et al. | |
| 7,606,975 B1 | 10/2009 | Shar et al. | |
| 2001/0032307 A1 | 10/2001 | Rohlman et al. | |
| 2002/0095553 A1 | 7/2002 | Mendelson et al. | |
| 2002/0144101 A1 | 10/2002 | Wang et al. | |
| 2003/0005271 A1 | 1/2003 | Hsu et al. | |
| 2003/0084375 A1 | 5/2003 | Moore et al. | |
| 2004/0015627 A1 | 1/2004 | Desoli et al. | |
| 2004/0083352 A1 | 4/2004 | Lee | |
| 2004/0107336 A1 | 6/2004 | Douglas et al. | |
| 2004/0193857 A1 | 9/2004 | Miller et al. | |
| 2005/0108719 A1 | 5/2005 | Need et al. | |
| 2005/0125632 A1 | 6/2005 | Alsup et al. | |
| 2005/0289324 A1 | 12/2005 | Miller et al. | |
| 2005/0289529 A1 | 12/2005 | Almog et al. | |
| 2006/0179346 A1 | 8/2006 | Bishop et al. | |
| 2007/0157007 A1 * | 7/2007 | Jourdan et al. | 712/220 |

OTHER PUBLICATIONS

Almog, Y. et al., Specialized Dynamic Optimizations for High-Performance Energy-Efficient Microarchitecture, Proceedings of the International Symposium on Code Generation and Optimization, 2004 (12 pages).
Chaparro, P. et al., Distributing the Fronted for Temperature Reduction, Proceedings of the 11th Symposium on High-Performace Computer Architecture, Feb. 12-16, 2005 (10 pages).
Colwell, R. P. et al., A VLIW Architecture for a Trace Scheduling Compiler, 1987, pp. 180-192 (13 pages).
Fisher, J. A., Trace Scheduling: A Technique for Global Microcode Compaction, IEEE Transactions on Computers, vol. C-30, No. 7, Jul. 1981, pp. 478-490 (13 pages).
Friendly, D. et al, Putting the Fill Unit to Work: Dynamic Optimizations for Trace Cache Microprocessors, Proceedings of the 31st Annual ACM/IEEE International Symposium on Microarchitecture, Nov. 30-Dec. 2, 1998, pp. 173-181 (9 pages).
Grunwald, D. and Ghiasi, S., Microarchitectural Denial of Service : Insuring Microarchitectural Fairness, Proceedings of the 35th Annual IEEE/ACM International Symposium on Microarchitecture, Nov. 18-22, 2002 (10 pages).
Hinton, G. et al., The Microarchitecture of the Pentium 4 Processor, Intel Technology Journal Q1, 2001 (12 pages).
IBM Technical Disclosure Bulletin, Grouping of Instructions, v. 38, n. 8, Aug. 1, 1995, pp. 531-534 (4 pages).
Katevenis, E. G., Reduced Instruction Set Computer Architectures for VLSI, Berkley, California 1983, pp. 67-68 and 190 (7 pages).
Rotenberg, E., Bennett, S., and Smith, J. E., Trace Cache: a Low Latency Approach to High Bandwidth Instruction Fetching, In Proceedings of the 29th Annual International Symposium on Microarchitecture, Dec. 2-4, 1996, Paris, France (11 pages).
Slechta, B. et al, Dynamic Optimization of Micro-Operations, Proceedings of the 9th International Symposium on High-Performance Computer Architecture, Feb. 8-12, 2003 (12 pages).
Smith, J. E. and Pleszkun, A. R., Implementation of Precise Interrupts in Pipelined Processors, Proc. Computer Architecture, 1985 (15 pages).
Tremblay, M., High-Performance Fault-Tolerant VLSI Systems Using Micro Rollback, Los Angeles, California, Sep. 1991, pp. 72-74, 81, 89-90, 102-104 and 246 (14 pages).
Vijaykumar, T. N., et al., Speculative Versioning Cache, IEEE Transaction on Parallel and Distributed Systems, vol. 12, No. 12, Dec. 2001, pp. 1305-1317 (13 pages).
Patel, S., Lumetta, S., "rePlay: A Hardware Framework for Dynamic Optimization, IEEE Transactions on Computers", vol. 50, No. 6, Jun. 2001 (26 pages).
Tanenbaum, A. S., Structured Computer Organization, Fourth Edition, Prentice Hall, Inc. 1984 (21 pages).
Patel S. J. et al., Improving Trace Cache Effectiveness with Branch Promotion and Trace Packing, IEEE, 1998, pp. 262-271.
Tanenbaum, A. S., Structured Computer Organization, Second Edition, Prentice Hall, Inc. 1984, pp. 10-12.
Eric Rotenberg, James E. Smith, Control Independence in Trace Processors, Proceedings of the 32nd Annual ACM/IEEE International Symposium on Microarchitecture, p. 4-15, Nov. 16-18, 1999, Haifa, Israel.
Eric Rotenberg, Quinn Jacobson, Yiannakis Sazeides, Jim Smith, Trace Processors, Proceedings of the 30th Annual ACM/IEEE International Symposium on Microarchitecture, p. 138-148, Dec. 1-3, 1997, Research Triangle Park, North Carolina, United States.
Quinn Jacobson, Eric Rotenberg, James E. Smith, Path-Based Next Trace Prediction, Proceedings of the 30th Annual ACM/IEEE International Symposium on Microarchitecture, p. 14-23, Dec. 1-3, 1997, Research Triangle Park, North Carolina, United States.

* cited by examiner

*Primary Examiner*—Eddie P Chan
*Assistant Examiner*—Idriss N Alrobaye
(74) *Attorney, Agent, or Firm*—Osha • Liang LLP

(57) ABSTRACT

A method and apparatus for optimizing a sequence of operations adapted for execution by a processor is disclosed to include locating an operation, if any, that is next within the sequence of operations and setting a current operation to be that operation. The current operation is processed as follows: a) de-activating, if not already de-activated, a consumed indicator associated with the current operation; and b) when the current operation is of the producer type, then activating, if not already activated, a producer indicator associated with the current operation, and locating a first set of operations, if any, that i) are earlier in the sequence of operations than the current operation, ii) have their associated producer indicator activated, and iii) have their associated consumed indicator de-activated, and then de-activating the producer indicator associated with each operation in the first set. When the current operation is of the consumer type, then locating a second set of operations, if any, that are earlier in the sequence of operations than the current operation, and then activating, if not already activated, the consumed indicator associated with each operation in the second set.

13 Claims, 22 Drawing Sheets

| opcode+ | dsize | dest/data | src1 | src2 | src3 |
|---|---|---|---|---|---|
| 33  23 | 22  20 | 19  15 | 14  10 | 9  5 | 4  0 |

FIG. 2

| OpT ctrl bits | Op slot 0 overhead byte | Op slot 1 overhead byte | Op slot 2 overhead byte | Op slot 0 | Op slot 1 | Op slot 2 |
|---|---|---|---|---|---|---|
| 127  126 | 125  118 | 117  110 | 109  102 | 101  68 | 67  34 | 33  0 |

FIG. 3

| | | | | R0=1 | MEM[R7-4]=R0 | R7=R7-4 | R1=R2 | R1=R1+R3 | R1=R1+2 | MEM[R7-4]=R1 | R7=R7-4 |
|---|---|---|---|---|---|---|---|---|---|---|---|
| Working OP No. | | | | 1 | 2 | 3 | 4 | 5 | 6 | 7 | 8 |
| Register Table (include pending op.) | R0 | R0 | R1 | 1 | R0 | | | | | | |
| | R1 | R2 | R3 | | | | R2 | R2+R3 | R2=R3+2 | R1 | |
| | R2 | R4 | R5 | | | | | | | | |
| | R3 | R6 | R7 | | | R7-4 | | | | | R7-8 |
| Emitted Op to Schedule Buffer | | | | R0=1 | R0=1<br>MEM[R7-4]=R0 | | | | | | R1=R2+R3+2<br>MEM[R7-8]=R1 |

FIG. 12

FLAG OPTIMIZATION OF A TRACE

CROSS REFERENCE TO RELATED APPLICATIONS

This application claims the benefit of priority document U.S. Provisional Application No. 60/889,547, entitled "Instruction Sub-Type Tracking Unit", filed on Feb. 13, 2007 and further claims the benefit of priority document U.S. Provisional Application No. 60/862,609, entitled "Exception Handling for Atomic Traces", filed on Oct. 24, 2006, and further claims the benefit of priority document U.S. Provisional Application No. 60/721,385, filed on Sep. 28, 2005, entitled "Efficient Trace Cache Management During Self-Modifying Code Processing," by Leonard Shar et al., and further claims the benefit of priority document U.S. Provisional Application No. 60/730,550, filed on Oct. 26, 2005, entitled "Checkpointing Status Flags for Atomic Traces," by John Gregory Favor et al., and further claims the benefit of priority document U.S. Provisional Application No. 60/730,810, filed on Oct. 27, 2005, entitled "Allocation and Deallocation of Shadow Registers used by Atomic Traces," by John Gregory Favor et al., and further claims the benefit of priority document U.S. Provisional Application No. 60/731,962, filed on Oct. 31, 2005, entitled "Determining the Highest Priority Abort Trigger in an Atomic Trace," by John Gregory Favor et al., and further claims the benefit of priority document U.S. Provisional Application No. 60/731,785, filed on Oct. 31, 2005, entitled "Maintaining Memory Coherency within a Trace Cache," by Richard W. Thaik, and further claims the benefit of priority document U.S. Provisional Application No. 60/732,438, filed Nov. 1, 2005, entitled "Zero-Cycle Execution of Clear Operation and Automatic Register Free," by John Gregory Favor et al., and further claims the benefit of priority document U.S. Provisional Application No. 60/832,848, filed on Jul. 23, 2006, entitled "Microprocessor with Caches for Instructions, Basic Blocks, and Traces," by Don Alpert et al., and further claims the benefit of priority document U.S. Provisional Application No. 60/832,822, filed on Jul. 23, 2006, entitled "Microprocessor with Coherent Caches for Basic Blocks and Traces," by Don Alpert et al., and further claims the benefit of priority document U.S. Provisional Application No. 60/862,609, filed Oct. 24, 2006, entitled "Exception Handling for Atomic Traces," by Christopher P. Nelson, and further claims the benefit of priority document U.S. Provisional Application No. 60/866,205, filed Nov. 16, 2006, entitled "Processor with Optimized Operation Sequences for Basic Block and Multi-Block Trace Caches," by John Gregory Favor, and further claims the benefit of priority document U.S. Provisional Application No. 60/866,203, filed Nov. 16, 2006, entitled "Processor with Basic Block and Multi-Block Trace Caches," by Matt Ashcraft et al. John Gregory Favor is also known as John Favor or as Greg Favor. Each of the above named priority documents are hereby incorporated by reference.

This application is a continuation-in-part of U.S. patent application Ser. No. 11/781,937, filed on Jul. 23, 2007 and entitled "A Trace Unit with a Decoder, A Basic Block Builder, and A Multi-Block Builder", which is a continuation-in-part of U.S. patent application Ser. No. 11/535,971, filed Sep. 27, 2006, entitled "Efficient Trace Cache Management During Self-Modifying Code Processing," by Leonard Eric Shar et al., and is a continuation-in-part of U.S. patent application Ser. No. 11/535,972, filed Sep. 27, 2006, entitled "Selective Trace Cache Invalidation for Self-Modifying Code Via Memory Aging," by Leonard Eric Shar et al., is a continuation-in-part of U.S. patent application Ser. No. 11/535,977, filed Sep. 27, 2006, entitled "Trace Cache for Efficient Self-Modifying Code Processing," by Leonard Eric Shar, is a continuation-in-part of U.S. patent application Ser. No. 11/553,453, filed Oct. 26, 2006, entitled "Checkpointing Statrace unit 12s Flags for Atomic Traces," by Greg Favor et al., and is a continuation-in-part of U.S. patent application Ser. No. 11/553,455, filed Oct. 26, 2006, entitled "Checkpointing Flags On-Demand for Atomic Traces," by John Gregory et al., and is a continuation-in-part of U.S. patent application Ser. No. 11/553,458, filed Oct. 26, 2006, entitled "Flag Restoration from Checkpoints for Aborts of Atomic Traces," by John Gregory Favor et al., and is a continuation-in-part of U.S. patent application Ser. No. 11/591,024, filed Oct. 31, 2006, entitled "Maintaining Memory Coherency within a Trace Cache," by John Gregory Favor. John Gregory Favor is also known as John Greg Favor. Each of the above named applications for which this application is a continuation in part is hereby incorporated by reference.

This application is related to U.S. patent application Ser. No. 11/941,895, filed on Nov. 16, 2007, and entitled "A METHOD AND SYSTEM FOR PROMOTING TRACES IN AN INSTRUCTION PROCESSING CIRCUIT", the disclosure of which is herein incorporated by reference as though set forth in full.

BACKGROUND OF THE INVENTION

Processors have evolved throughout recent decades by becoming smaller in size, more sophisticated in design and, faster in performance. Such an evolution has resulted for numerous reasons, one of which is the portability of systems incorporating processors. Portability introduces demands on processors such as smaller size, reduced power and efficient performance.

A processor (such as a microprocessor) processes instructions according to an instruction set architecture. The processing comprises fetching, decoding, and executing the instructions. Some instruction set architectures define a programming model where fetching, decoding, executing, and any other functions for processing an instruction are apparently performed in strict order, beginning after the functions for all prior instructions have completed, and completing before any functions of a successor instruction has begun. Such an instruction set architecture provides a programming model where instructions are executed in program order.

Some processors process instructions in various combinations of overlapped (or non-overlapped), parallel (or serial), and speculative (or non-speculative) manners using, for example, pipelined functional units, superscalar issue, and out-of-order execution. Thus, some processors are enabled to execute instructions and access memory in an order that differs from the program order of the programming model. Nevertheless, the processors are constrained to produce results consistent with results that would be produced by processing instructions entirely in program order.

Applications of processors are, for example, in personal computers (PCs), workstations, networking equipment and portable devices. Examples of portable devices include laptops, which are portable PCs, and hand-held devices.

Due to the wide use of hardware and software applications dependent on either of or both the x86 or x87 instruction sets, particularly by software programmers who have become well accustomed to this code and are not likely to readily adapt to another code, backward compatibility of code is key in the architecture of a new processor. That is, the user of a newlydesigned processor must enjoy the ability to use the same code utilized in a previous processor design without experiencing any problems.

In trace-based processor architectures, different trace types are used to significantly optimize execution by the back end, or execution unit, of the processor. Traces are generally built by the front end or trace unit (or instruction processing unit) of a processor. A trace includes one or more sequences of operations with each operation corresponding to an instruction or a number of operations corresponding to the same instruction.

Different types of traces might include a decoder trace, basic block trace, a multi-block trace or a microcode trace. A multi-block trace is made of one or more basic block traces, one or more multi-block traces or a combination thereof. A microcode trace is used when, for example, a sequence of instructions is either complex or rare. U.S. patent application Ser. No. 11/781,937, entitled "A Trace Unit with a Decoder, A Basic Block Builder, and A Multi-Block Builder" and filed on Jul. 23, 2007, the disclosure of which is incorporated herein by reference as though set forth in full, presents further details of such traces.

A trace, in some trace-based architectures, includes operations that do not necessarily correspond to instructions in the instructions' original program order. That is, knowledge of the original program order of the instructions is lost in a trace. Moreover, an instruction may result in multiple operations. Additionally, there is no clear instruction boundary.

During the 1980's, it became common for processor architectures to use multiple pipelines executing operations in parallel to reduce clocks per executed instruction (CPI). Such pipeline execution of operations is done in superscalar-based processor architectures.

Computer processor performance is determined by the number of instructions executed per cycle, processor clock cycle time, and CPI. This and other factors are used to calculate execution time according to the following equation:

Execution Time=(Number of Instructions)*(CPI)*
(Clock Cycle Time) Performance is then
inversely proportional to execution time, and
cycle time has been reduced by improved processor design.

A compiler can reduce the number of operations executed by eliminating operations that are unnecessary along the identified trace. In some usage scenarios, the effectiveness of trace scheduling is related to accuracy of the compiler in predicting branches within the trace. Computers with Very Long Instruction Words (VLIW) that could express dozens of parallel operations were developed to exploit trace scheduling.

Compilers can increase the Instruction Level Parallelism (ILP) of a trace by eliminating or scheduling operation dependencies to minimize pipeline delays in superscalar-based processor architectures. The latter allows a number of operations to execute substantially simultaneously. In general, the number of operations that can be executed in parallel is limited by control, data, and resource dependencies between operations. A control dependency occurs when the execution of an operation depends on the resolution of a previous branch instruction. A data dependency occurs when an operation has a source or destination operand that depends on the result of another operation. A resource dependency occurs when two or more operations require the same hardware resource. ILP allows execution of multiple operations simultaneously that would otherwise have to be executed in series. Thus, it is desirable to reduce the number of clock cycles required for executing operations, thereby increasing performance.

Conventional processors have a front end that is not a hardware-based compiler for building and optimizing traces. The back end of a processor would benefit from the faster and more efficient hardware-based compiler when executing races. While techniques for software compilation are known, such software techniques consume computing resources that would otherwise be available to execute a user application.

The potential performance benefits of hardware trace optimization has been explored, however no practical structures and techniques for hardware trace optimization in a high-performance microprocessor are known.

In light of the foregoing, there is a need for a processor for performing hardware trace optimization.

SUMMARY OF THE INVENTION

To overcome the limitations in the prior art described above, and to overcome other limitations that will become apparent upon reading and understanding the present specification, the present invention discloses a method and corresponding structures for optimization a trace.

Briefly, a method and apparatus, in accordance with an embodiment of the present invention includes optimizing a sequence of operations adapted for execution by a processor by locating an operation, if any, that is next within the sequence of operations and setting a current operation to be that operation. The current operation is processed as follows: a) de-activating, if not already de-activated, a consumed indicator associated with the current operation; and b) when the current operation is of the producer type, then activating, if not already activated, a producer indicator associated with the current operation, and locating a first set of operations, if any, that i) are earlier in the sequence of operations than the current operation, ii) have their associated producer indicator activated, and iii) have their associated consumed indicator de-activated, and then de-activating the producer indicator associated with each operation in the first set. When the current operation is of the consumer type, then locating a second set of operations, if any, that are earlier in the sequence of operations than the current operation, and then activating, if not already activated, the consumed indicator associated with each operation in the second set.

These and other objects and advantages of the present invention will no doubt become apparent to those skilled in the art after having read the following detailed description of the preferred embodiments illustrated in the several figures of the drawing.

IN THE DRAWINGS

FIG. 2 illustrates an example format of an integer operation, which includes six fields that specify an operation and data size of 1 to 16B, up to three source operands, and a destination register.

FIG. 3 illustrates an example format of an OpT (or operation "triplet") with "slots" identified for holding up to three operations.

FIG. 12 illustrates the contents of registers, as working operations are optimized by the optimization logic, and symbolic expressions resulting therefrom, in accordance with an exemplary embodiment of the present invention.

Figure 16:
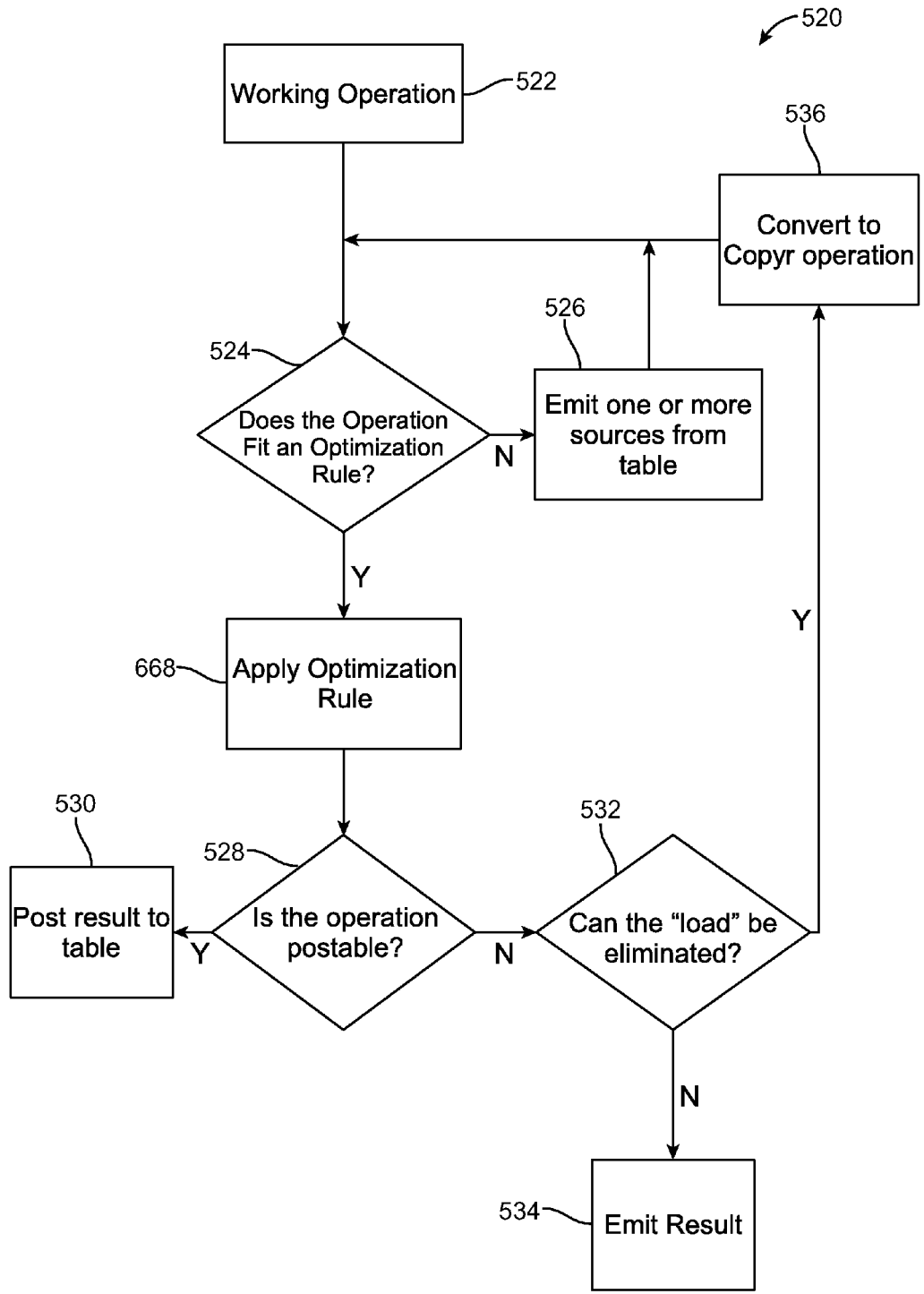

FIG. 16 shows the symbolic renaming optimization 520 performed when a working operation is read by the symbolic renaming logic 525 of the optimization control logic 508.

Figure 17:
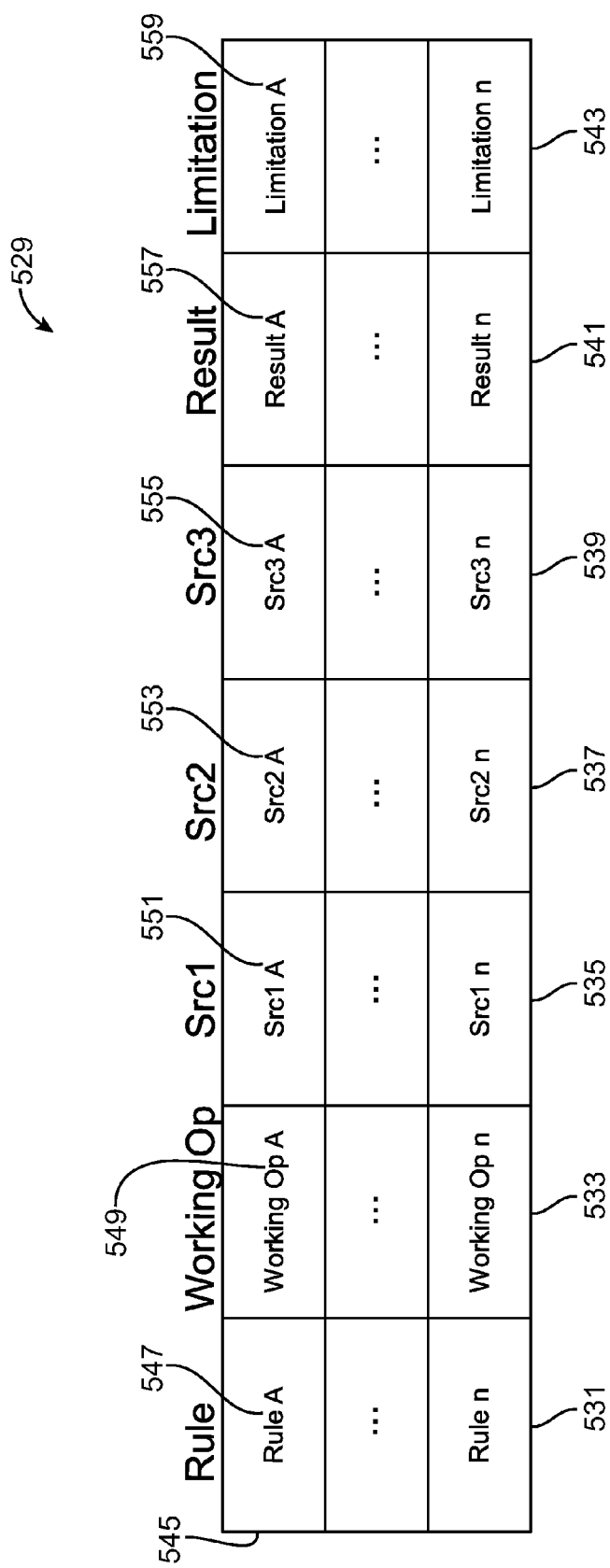

FIG. 17 shows an optimization rule lookup table 529, which is included in the optimization control logic 508 in an embodiment of the present invention.

Figure 18:
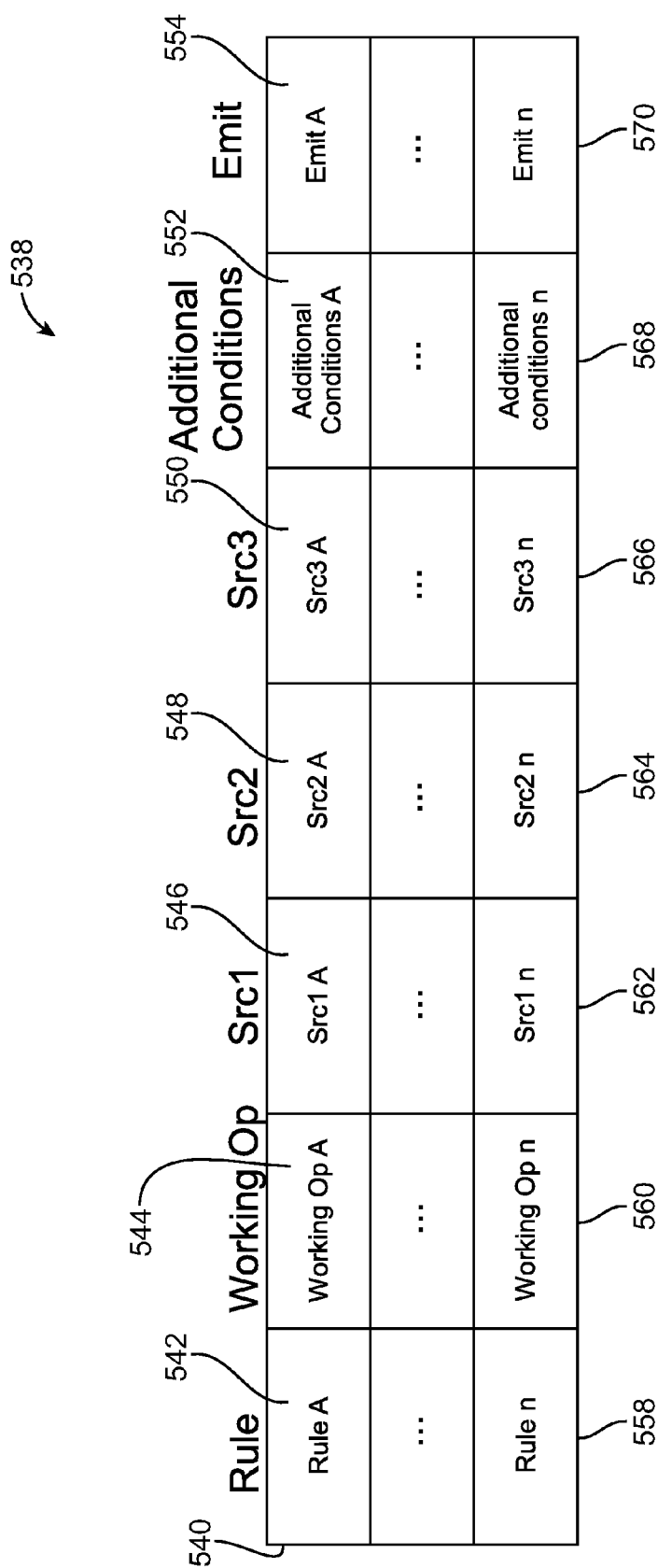

FIG. 18 shows an optimization failure emit lookup table 538, in accordance with an embodiment of the present invention.

Figure 19:
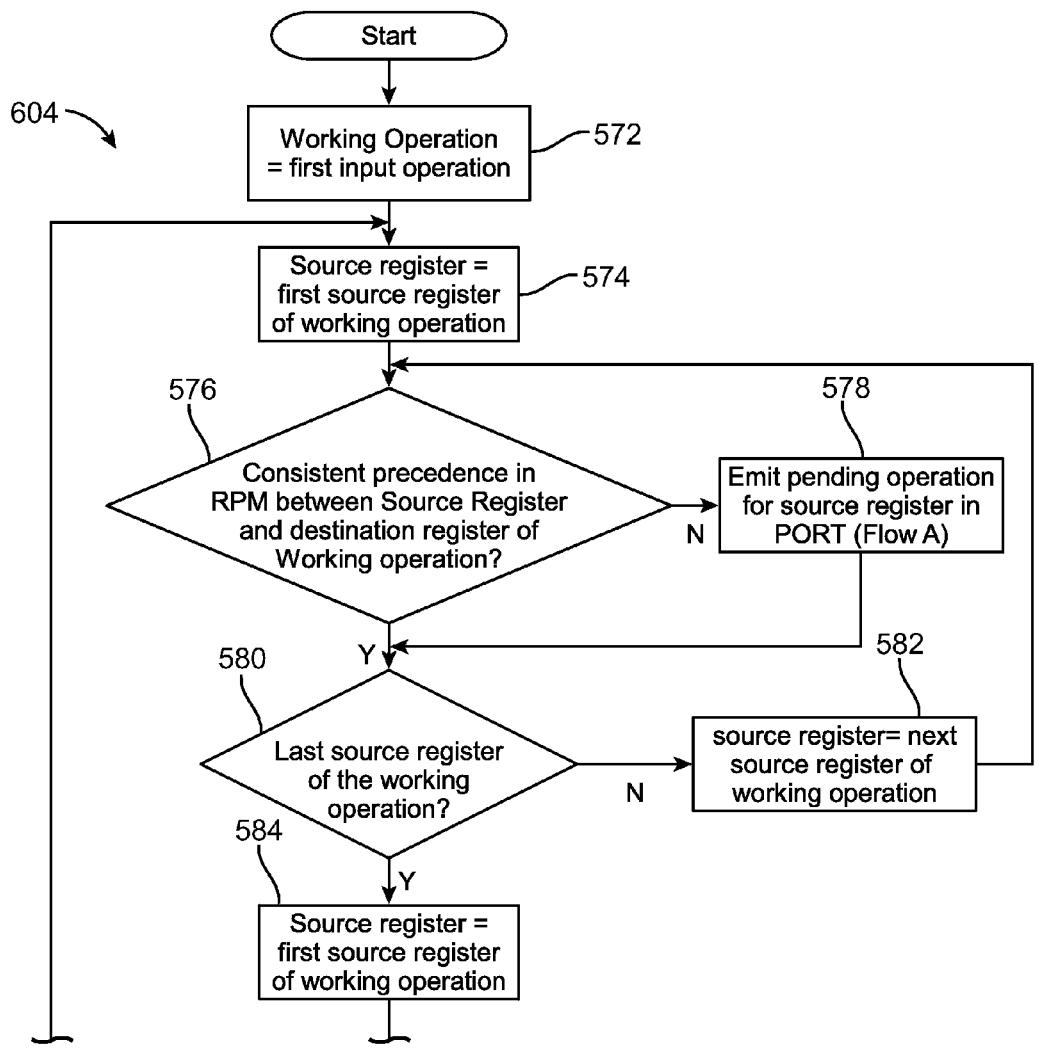
Figure 19:
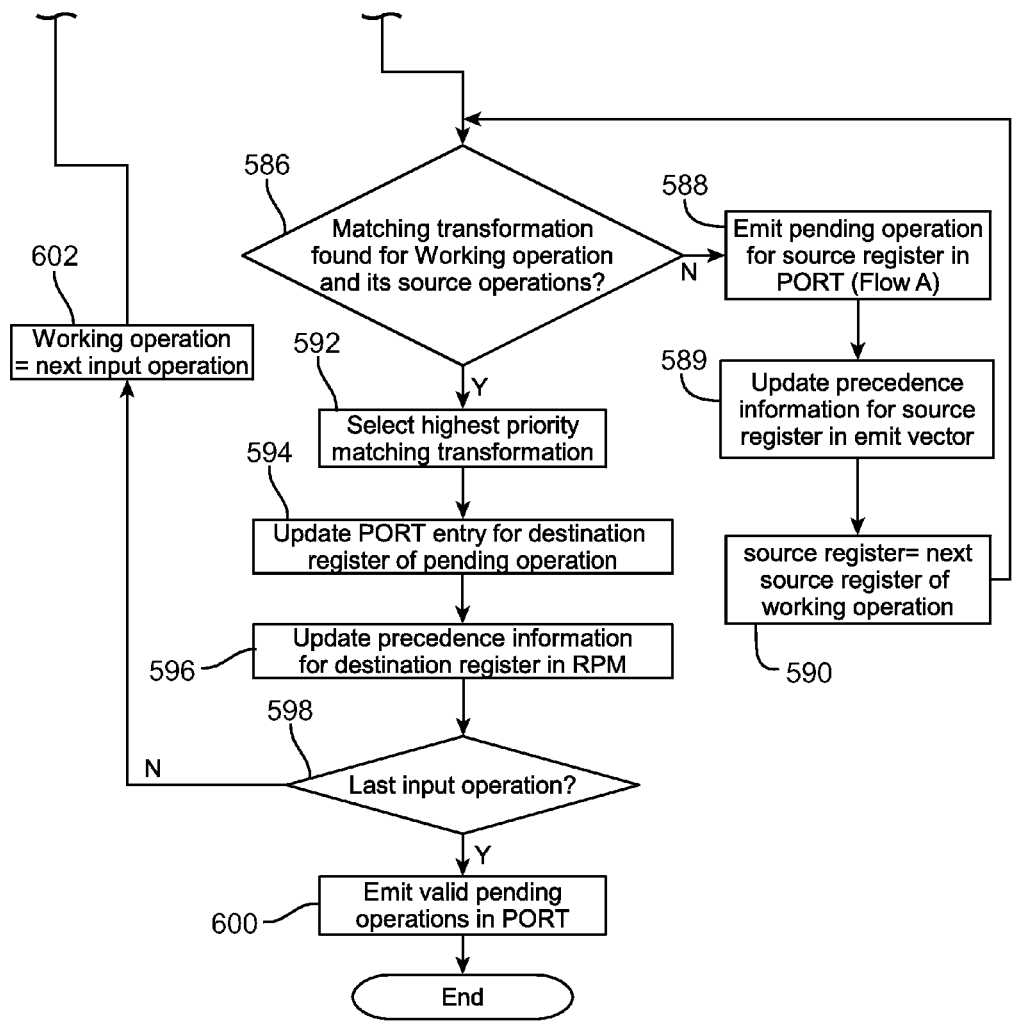

FIG. 19 shows the optimization rule lookup table comparison process 604 performed when a working operation is processed by the symbolic renaming logic 525 of the optimization control logic 508 and compared to the optimization rules contained in the optimization rule lookup table 529.

Figure 20:
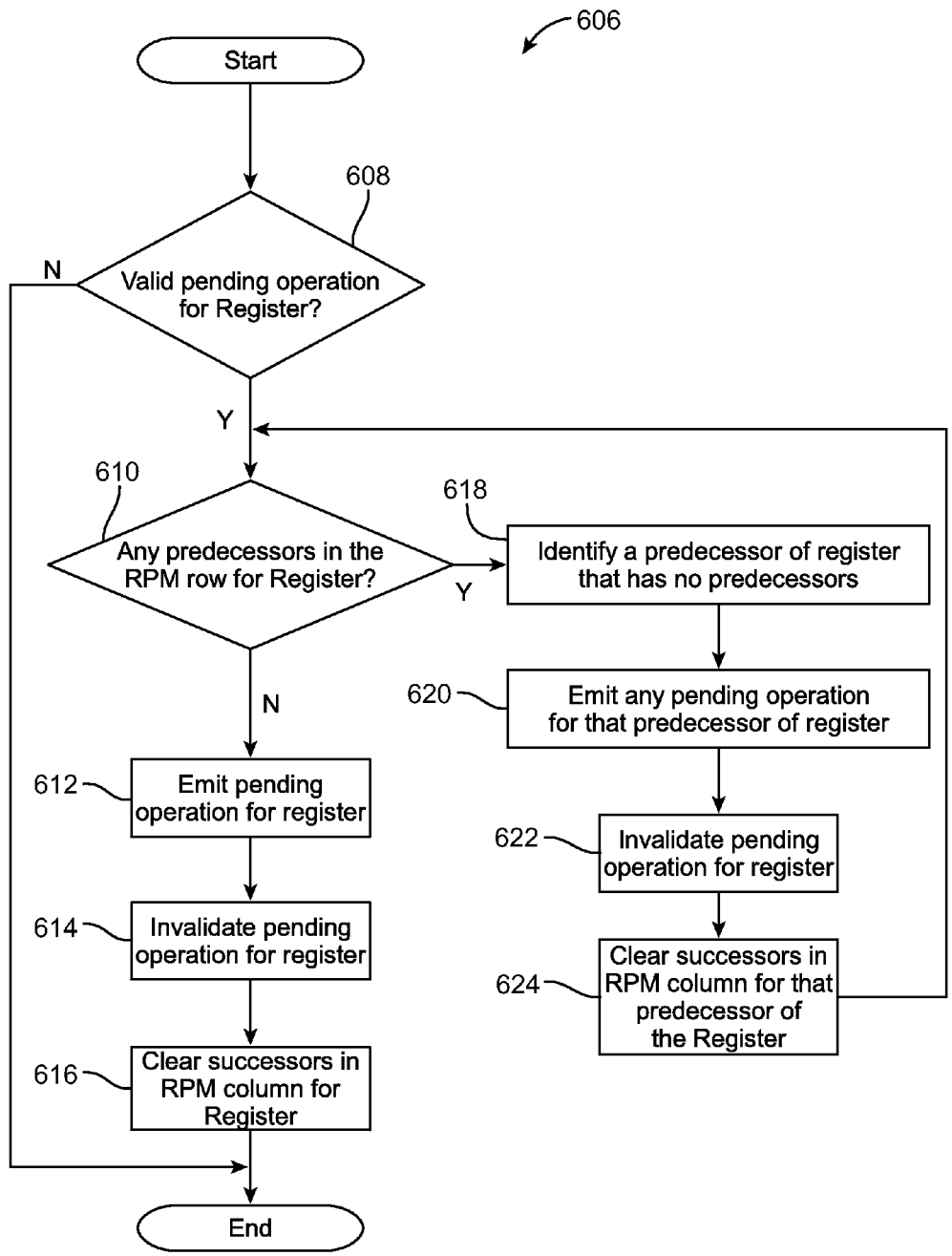

FIG. 20 shows the register table emit process 606 performed when one or more valid operations posted to the register table 510 are emitted to the schedule buffer 58.

Figure 21:
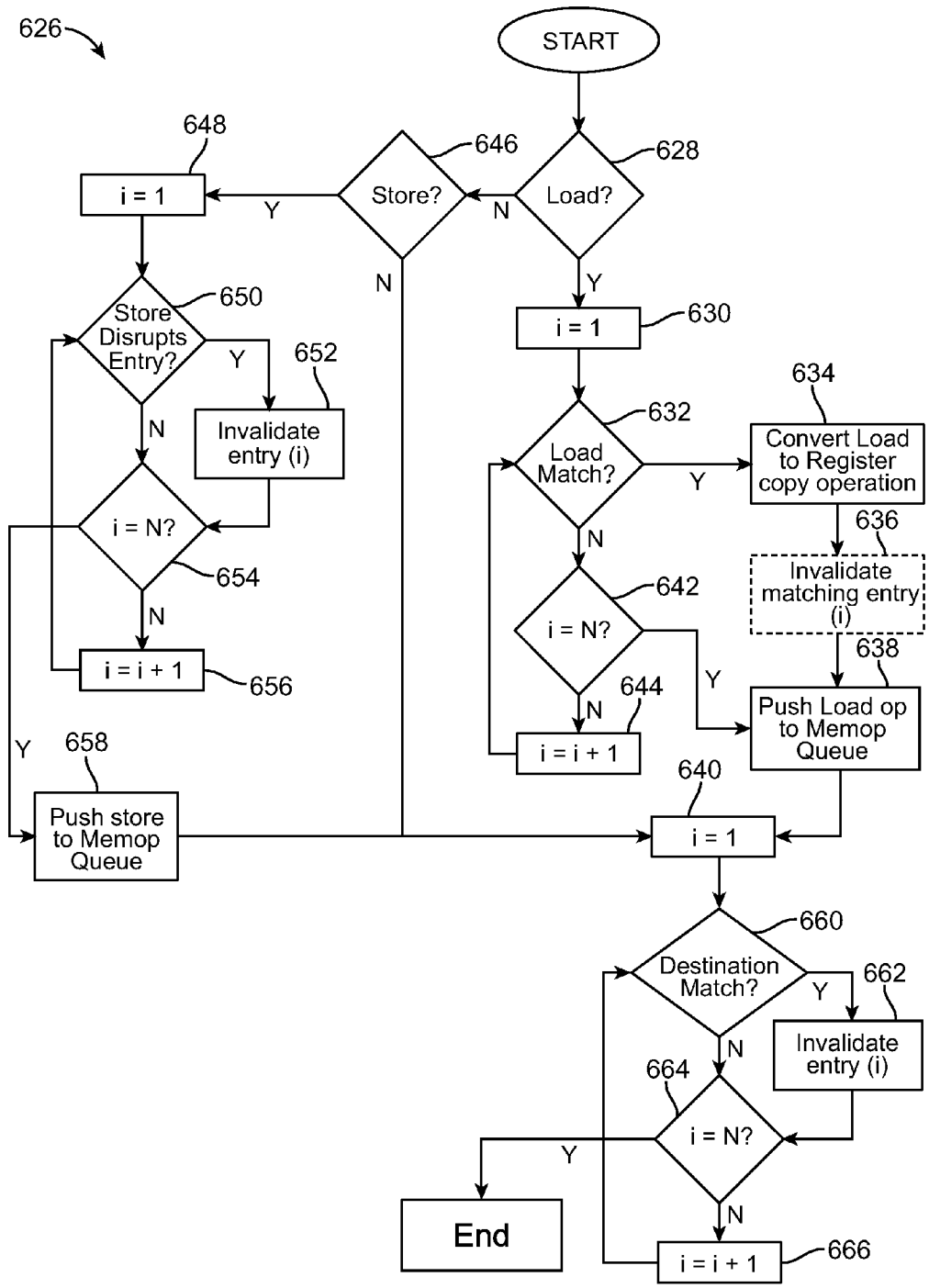

FIG. 21 shows a flow chart of the steps performed by the load elimination logic 527.

DETAILED DESCRIPTION OF THE PREFERRED EMBODIMENT

In the following description of the embodiments, reference is made to the accompanying drawings that form a part hereof, and in which is shown by way of illustration of the specific embodiments in which the invention may be practiced. It is to be understood that other embodiments may be utilized because structural changes may be made without departing from the scope of the present invention.

Reference is made herein to a trace unit (TU) (or front end) and an execution unit (XU) (or back end) of a processor, the latter includes an integer unit (IU) and the former generally builds and optimizes traces and passes the built and potentially optimized traces to the XU. A trace is a sequence of operations and operations correspond to instructions. An instruction may result in one or more operations. Traces may be of various types. For example, a trace may be a decoder trace, a basic block trace, a multi-block trace or a microcode trace, which are all built by the TU. The TU specifically attempts to optimize basic and multi-block traces when building them by reducing the number of operations within a trace and by increasing the number of independent operations that can be executed in parallel, particularly in a superscalar type of architecture.

Operations correspond to instructions, such as but not limited to x86 instructions, and may be based on complex instruction set computer (CISC) instructions or reduced instruction set computer (RISC) instructions.

Figure 1:
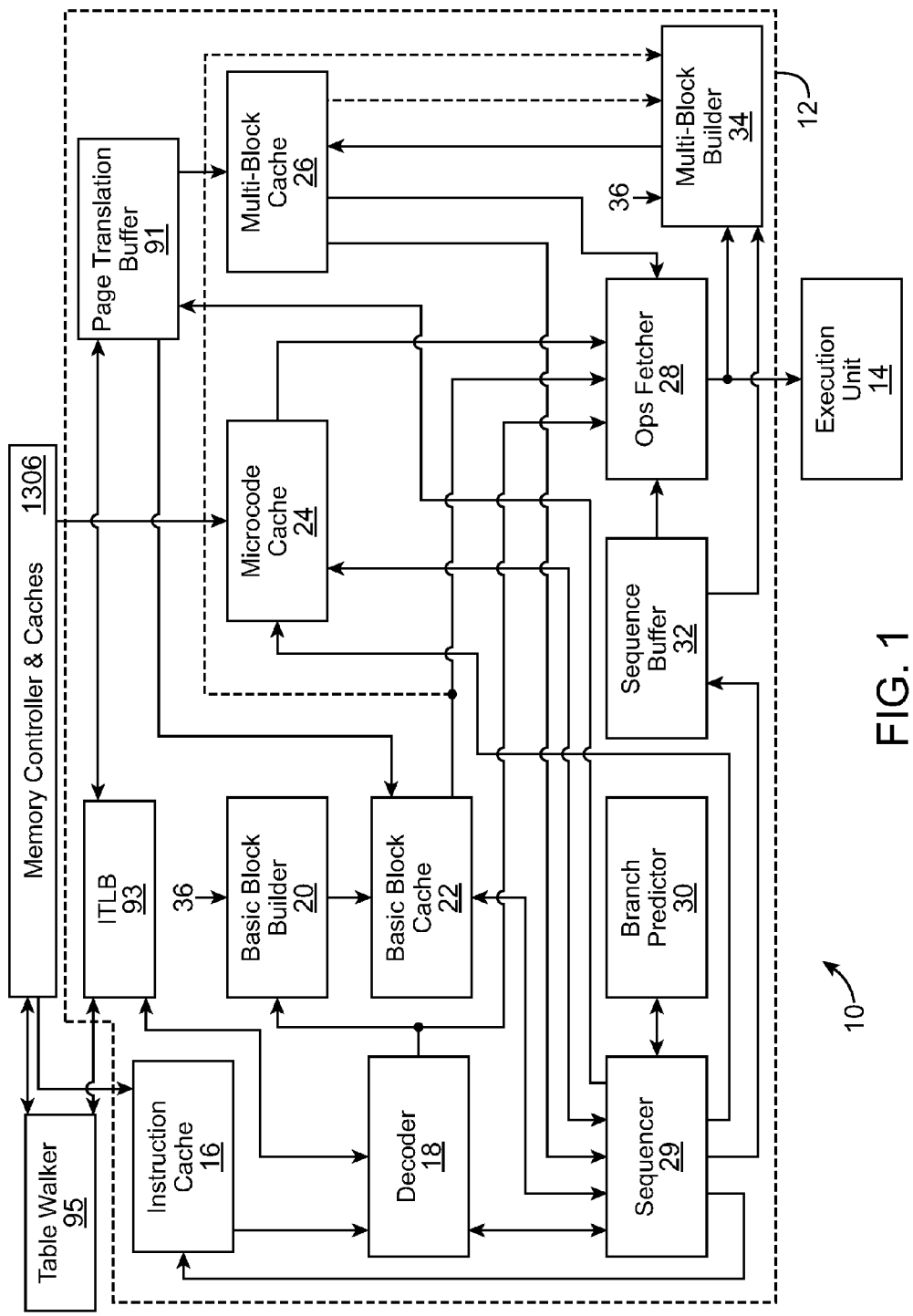
FIG. 1 shows a block diagram of the relevant components of the trace unit 12.

FIG. 1 shows a block diagram of the relevant components of the trace unit 12. In FIG. 1, a processor core 10 is shown to include a trace unit 12 coupled to an execution unit 14 and to a table walker (TW) 95, in accordance with an embodiment of the present invention. "Processor" and "microprocessor", as used herein are synonymous. "Execution unit" and "back end", as used herein, are synonymous.

The execution unit 14 generally executes a sequence of operations (also known as a "sequence of code" or "trace") provided by the trace unit 12. The trace unit 12 generally builds sequences of operations for use by the execution unit 14. In so doing, the trace unit 12 operates to reduce the workload of the execution unit 14 by optimizing the sequence of operations in, for example, a basic block and/or multi-block trace.

A processor generally executes a set of operations, processor set, derived from instructions, known to the processor. An example of the foregoing is the x86 processor set. A processor includes a set of registers to store (hold) information.

In accordance with an embodiment of the present invention, the trace unit 12 is shown to include an instruction cache circuit 16, a decoder circuit 18, a basic block builder circuit 20, a basic block cache circuit 22, a microcode cache circuit 24, a multi-block cache circuit 26, an operations fetcher circuit 28, a sequencer circuit 29, a branch predictor circuit 30, a sequence buffer circuit 32, a multi-block builder circuit 34, a page translation buffer (PTB) (also known as "page translation cache (PTC)") 91 and an instruction translation lookaside buffer (ITLB) 93. The ITLB 93 of the trace unit 12 is shown coupled to the table walker 95.

In an alternative embodiment, the basic block cache circuit 22 and the multi-block cache circuit 26 collectively comprise a trace cache circuit.

The basic block builder circuit 20 and the multi-block builder circuit 34 are collectively referred to as a trace builder circuit 36. While the trace builder circuit 36 is a single circuit in one embodiment of the present invention, in an alternative embodiment, the trace builder circuit 36 is more than one physical circuit. For example, the basic block builder circuit 20 of the trace builder circuit 36 is a physically-separate circuit from the multi-block builder circuit 34 of the trace builder circuit 36.

While in the embodiment of FIG. 1, the basic block and multi-block cache circuits 22 and 26 are shown to be physically separate circuits, alternatively, they may be the same physical circuit.

In FIG. 1, the instruction cache circuit 16 is shown coupled to the decoder circuit 18 and, through the decoder circuit 18, instruction cache circuit 16 receives requests from the sequencer circuit 29. The decoder circuit 18 is shown coupled to the basic block builder circuit 20 and to the operations fetcher circuit 28. The basic block builder 20 is shown coupled to the basic block cache circuit 22. The basic block cache circuit 22 is shown coupled to the operations fetcher circuit 28 and to the sequencer circuit 29. The PTB 91 is shown coupled to the sequencer circuit 29 and is further shown to provide information to the basic block cache circuit 22 and the multi-block cache circuit 26. The PTB 91 is further shown coupled to the ITLB 93, which is shown coupled to the table walker 95 and the decoder circuit 18.

The multi-block builder circuit 34 is shown coupled to the operations fetcher circuit 28 for receiving traces used to build a multi-block trace. Optionally, the multi-block builder circuit 34 is coupled to the basic block cache circuit 22 and the multi-block cache circuit 26 for receiving traces used to build a multi-block trace.

The operations fetcher circuit 28 is shown coupled to the microcode cache circuit 24, the basic block cache circuit 22, the multi-block cache circuit 26, the sequence buffer circuit 32 and the decoder circuit 18. The sequencer circuit 29 is shown coupled to the branch predictor circuit 30, the multi-block cache circuit 26, the microcode cache circuit 24 and the basic block cache circuit 22. The operations fetcher circuit 28 is shown coupled to the execution unit 14.

The instruction cache circuit 16 is a cache, which is a known form of memory, and is generally used to store instructions for optimization by the trace unit 12 before execution thereof by the execution unit 14. The instruction cache circuit 16 provides the stored sequence of instructions to the decoder circuit 18. Instructions, as are referred to herein, are any Reduced Instruction Set Computer (RISC)-based instructions or Complex Instruction Set Computer (CISC)-based instruction code, such as but not limited to the x86 instruction code set or Very Long Word Instruction (VLWI).

For further details of the trace unit 12 and its operation, the reader is referred to U.S. patent application Ser. No. 11/781, 937, entitled "A Trace Unit with a Decoder, A Basic Block Builder, and A Multi-Block Builder" and filed on Jul. 23, 2007.

As stated previously, the basic block builder circuit 20 builds and optimizes basic block traces, and the multi-block builder circuit 34 builds and optimizes multi-block traces. In one embodiment, the builders 34 and 20 are the same block. Some embodiments represent operations in a form that enables ready execution, such as that used in the embodiments illustrated in FIG. 2 and FIG. 3.

FIG. 2 illustrates an example format of an integer operation, which includes six fields that specify an operation and data size of 1 to 16B, up to three source operands, and a destination register. The use of three source operands enables representation of fused operations, such as adding two operands to a third. The first source operand and the destination operand are always registers. The second and third source operands can both be registers, or one can indicate an immediate value. For memory store operations, the "dest" field specifies the "data" register whose contents are stored to memory. Additional formats are used to represent floating-point and other types of operations. Another example of an opcode format is a load-long constant operation format, which includes a two bit opcode field and a 32-bit constant field. Such an operation is used to directly load a 32-bit constant into a selected scratch (non-architectural) register.

A ".cc" (or condition code) flag (or "field", or "indicator" or "bit") is included in the opcode of some operations and is indicative of an operation that produces at least one status (or condition code) flag.

FIG. 3 illustrates an example format of an OpT (or operation "triplet") with "slots" identified for holding up to three operations. The slots correspond directly to pipelines within a superscalar type processor architecture with the execution unit 14 where the assigned operations are executed. In some embodiments, some operations, such as integer addition, can be executed on three pipelines, one associated with each slot. Consequently, such an operation can be assigned to an arbitrary slot. Other operations, such as an integer multiply, are limited to a single pipeline associated with a specific slot. In some usage scenarios, assigning operations to a constrained set of slots reduces execution time cost and power by limiting the number of execution units, as well as by simplifying the distribution of operations to the units.

In FIG. 3, three "overhead bytes", i.e. Op Slot 0 overhead byte, Op Slot 1 overhead byte, Op Slot 2 overhead byte, are shown to represent immediate constants. A source operand can specify that an overhead byte within three before or after corresponding slot represents the least significant byte of a constant operand. The constant is represented by up to four successive overhead byte slots. When a constant can be represented in fewer than four bytes, the end of the constant is indicated by the next slot that specifies an immediate source operand.

From the description of OpT above, it is clear that a sequence of operations can be represented with numerous encoding variations. For example, a sequence of operations can be reordered to produce a shorter OpT representation via more efficient packing of slots and constants. Similarly, two operations can be fused into a single slot, and certain operations can be eliminated without affecting the resulting state. Therefore, as described below, various embodiments can include the basic block builder circuit 20 with various optimization techniques for OpT representations having better performance. Other embodiments are contemplated for use with other basic block circuits having other properties or optimizations.

As noted in the referenced patent/application above, the basic block circuit 20 sends the OpTs to the execution unit 14 for decoder trace execution and to basic block cache 22 for future basic block trace execution. In some embodiments, OpT pairs are advantageously used in conjunction with high-performance cores.

Operations with source and destination fields are shown to be in three overhead bytes, in accordance with the embodiment of FIG. 3. The fields can be pointers to registers, or pointers, to the overhead bytes. Thus, constants can be stored in the operation or in the overhead bytes. Three slots correspond to three integer units of the processor causing parallel execution of the operations in the slots. It is understood that any number of slots may be included in triplet (or OpT), however, to take advantage of parallel execution, additional integer units are needed. X86 instructions are represented by operations that are packed when built by a builder, such as the basic block builder circuit 20 or the multi-block builder circuit 34. This action is a form of code compilation performed by a hardware compiler allowing the caching of compiled operations.

Figure 4:
FIG. 4 shows an exemplary basic block cache entry, in accordance with an embodiment of the present invention.

FIG. 4 shows an exemplary basic block cache entry, in accordance with an embodiment of the present invention. Still further details of a basic block cache entry is shown and discussed relative to FIGS. 12 and 13 of U.S. patent application Ser. No. 11/781,937, entitled "A Trace Unit with a Decoder, A Basic Block Builder, and A Multi-Block Builder" and filed on Jul. 23, 2007. In some embodiments the Ops field as illustrated in FIG. 4 includes 4 OpTs, although other embodiments can include different numbers of operations. In some embodiments, the basic block cache 22 has 4-clock access time; therefore, the basic block cache 22 has a peak sequencing rate of 3 operations per clock.

In case the representation of a basic block trace requires more than 4 OpTs, it is useful to provide the capability of concatenating two or more consecutive entries to represent a longer basic block trace. If a representation of a basic block trace exceeds the number of entries that can be concatenated, then the trace can be artificially broken into two or more shorter, consecutive sequences.

In FIG. 4, the Next Address Field represents addresses for both the next sequential instruction and the destination of the branch that terminates the block. The next sequential address can be represented compactly by storing only the lower bits and an indication of whether the upper bits are the same as or incremented from the upper bits of the current block.

The sequencing control ("Seq Ctl") field represents the type of sequencing action to determine the next basic block cache (BBC) entry and other control information. For example, the sequencing action can be that of a conditional branch, indirect branch, procedure call, or procedure return. In some embodiments, this field also indicates whether a basic block cache entry is valid or concatenated, as described above.

The promotion history ("Promo History") field represents information about the historical outcome of the terminating branch of the basic block, such as the outcome for the last branch execution and the number of consecutive executions with the same outcome. The Promotion History is used to determine whether the basic block cache entry is to be promoted to the multi-block cache, as described below. The coherence field represents information used to maintain basic block cache coherence with memory when instructions or associated translation tables are modified.

When the sequencer circuit 29 initiates an operation access that is located in basic block cache 22, as described below, in one embodiment of the present invention, the basic block cache sends up to 2 valid OpTs to the ops fetcher circuit 28 and the ops fetcher circuit 28 sends one OpT to the execution unit 14 and to the multi-block builder circuit 34. The basic block cache 22 also sends the next address and sequencing control information to the ops fetcher circuit 28. When a basic block trace is terminated by a conditional branch, the execution unit 14 sends to the trace unit 12 the outcome of the branch, which the basic block cache 22 uses to update the promotion history field.

Figure 5:
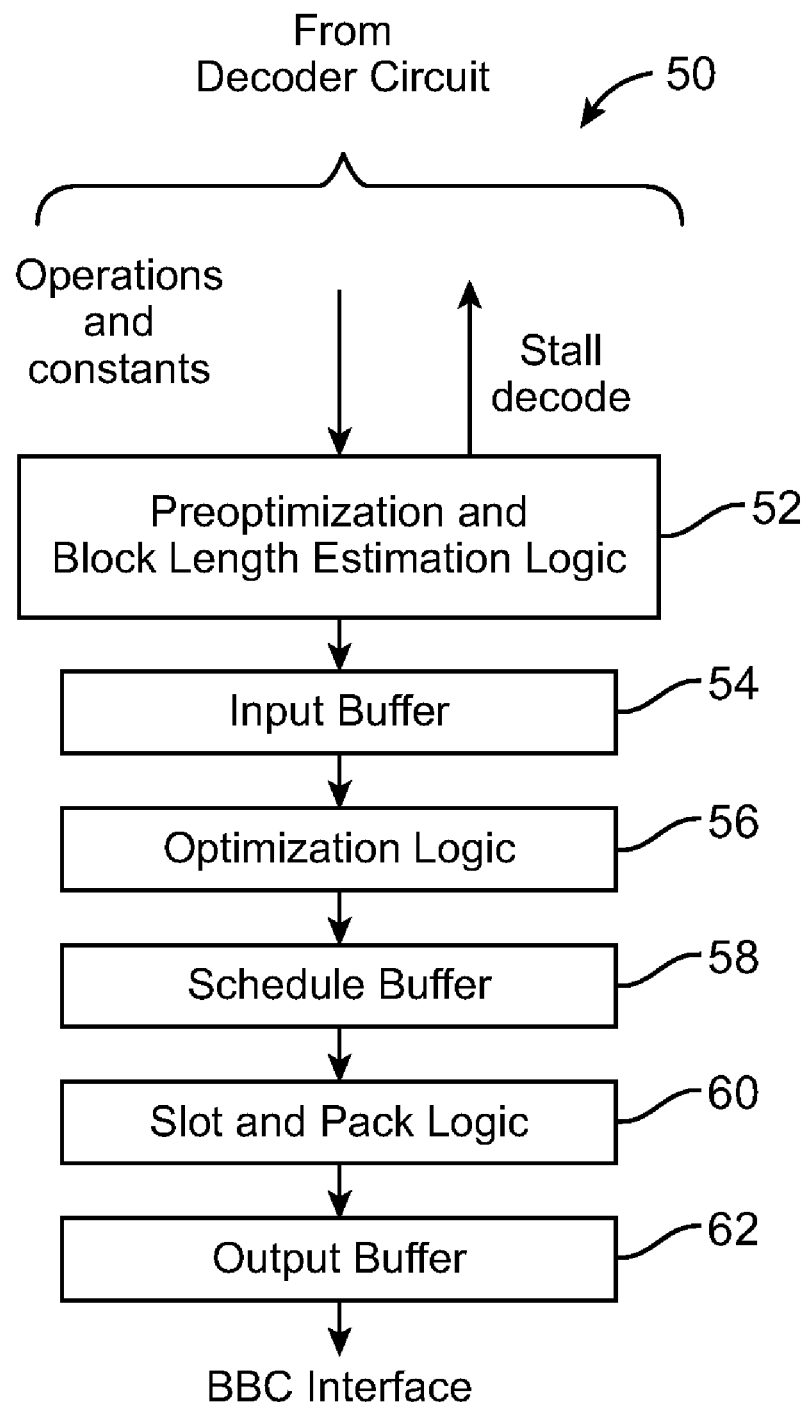
FIG. 5 illustrates selected details 50 of an embodiment of a basic block builder circuit 20, in accordance with an embodiment of the invention.

FIG. 5 illustrates selected details 50 of an embodiment of a basic block builder circuit 20, in accordance with an embodiment of the invention. The basic block builder circuit 20 receives a decoder trace from the decoder circuit 28 with the trace including a sequence of operations. The basic block builder circuit 20 uses the received decoder trace to build and optimize a basic block cache entry in a series of three phases, as shown in FIG. 5: (1) Preoptimize and estimate block length, (2) Optimize, and (3) Slot and Pack. FIG. 5 illustrates a block diagram 50 of an embodiment of the basic block builder circuit 20.

The circuit 20 is shown to include a preoptimization and block length estimation logic (or "preoptimization logic") 52, an input buffer 54, an optimization logic 56, a schedule buffer 58, a slot and pack logic 60 and an output buffer 62, in accordance with an embodiment of the present invention. The preoptimization logic 52 is shown to receive operations and associated, constants, for example 2 constants, from the decoder circuit 18. In an exemplary embodiment, three operations are received by the preoptimization logic 52 and in another exemplary embodiment, the constants are 32 bits. The preoptimization logic 56, as described below, places the resulting operations and full constants into the input buffer 54. In an exemplary embodiment, the input buffer 54 has 30 entries for the basic block builder 20 and 48 entries for the multi-block builder 34. The preoptimization logic 52 generally performs preoptimization to, for example, fuse a flag producer operation with a nopassert operation. During pre-optimization, the preoptimization logic 52 also estimates the length of the final basic block cache entry. If the estimated length reaches a predetermined maximum number, such as 8 OpTs, that can be stored in a consecutive pair of basic block cache entries, the basic block builder circuit 20 or the multi-block builder circuit 26, as the case may be, signals the sequencer 29 that the current build is complete.

Accordingly, the input buffer 54, after preoptimization, includes operations of a trace that have had their flags removed, to the extent possible, and have been potentially fused thereby reducing the number of operations than that within the received decoder trace.

The operations of the trace being received by the preoptimization logic 52 is in a form of expanded OpT representation that is accepted by the execution unit 14. As stated previously, in an exemplary embodiment, this representation includes up to three operations and two 32-bit constants. Any unused slots are represented as nops. Each OpT that includes the final operation of a decoded instruction is marked so that if the basic block builder circuit 20 needs to end the trace, it can do so on an instruction boundary. Logic in the preoptimization phase removes all received nops, and loads the remaining sequence of operations and associated constants into the input buffer 54.

The basic block builder circuit 20 estimates the length of the optimized output block. In one embodiment, the basic block builder circuit 20 uses a conservative estimate that is based on determining the maximum possible length assuming that (1) all constants larger than a predetermined number of bits, such as 8 bits, are represented by a special long-constant operation and (2) each operation is placed in the next available slot that satisfies its resource restrictions. If the estimated length reaches the maximum that can be stored in a consecutive pair of basic block cache entries, the basic block builder circuit 20 signals the decoder circuit 18 to stall.

In an alternate embodiment, basic block builder circuit 20 checkpoints certain information when it reaches the conservative limit, but continues to receive operations from the decoder circuit 18 until the input buffer 54 is full. Then the basic block builder circuit 20 signals the decoder circuit 18 to stall. If the optimized output formed by the basic block builder circuit 20 would then be found to exceed that which can be stored in basic block cache circuit 22, the basic block builder circuit 20 restores its input to the checkpoint and processes the shorter block. Other embodiments account for other factors to be considered in determining when the basic block builder circuit 20 should stall or restart the decoder circuit 18. For example, the length in bytes of the instructions of the block may reach the range limit of a basic block cache entry "Next Address" field.

Input buffer 54 (also known as "condition code optimization buffer") is named with respect to its function of providing operations and associated data (such as constants) to optimizer logic 56.

It is noted that while some or most of the discussion herein is directed to building and optimization a basic block trace, the same applies to building and optimizing a multi-block trace unless otherwise indicated.

The pre-optimization logic 52 also processes the input buffer 54 to make simple substitutions and collect information to prepare for the optimize stage or that which is done by the optimization logic 56. For an example of a simple substitution, operations and constant values can be altered to a common form, such as using only non-negative constants, to simplify recognition in the optimize phase. One example of information collected is the production and use of condition flags, as described below.

Certain instruction set architectures, such as x86, use status flags to represent conditions associated with the execution of common instructions, such as whether the result of an arithmetic or logic operation is zero. When executing a sequence of instructions of such an architecture, it is common for many instructions to write (or "produce") flag values (or indicators) that are not read (or "consumed") before the flag values are overwritten. Consequently, it is beneficial to detect and identify instructions that produce flag values that are read, as well as the consumers of flag values. Such information is used by the optimization logic 56 to determine when instructions can be eliminated, combined, or reordered.

The following description describes representative structures and operations for an architecture where each arithmetic or logical operation writes a complete set of condition flags and a limited set of instructions reads the flags, such as add-with-carry or conditional branch. Other embodiments are in accordance with more complex condition flag handling, such as that for the x86 architecture, where certain instructions write only some of the condition flags.

As noted above, operations are of different types or classes. The embodiments of the present invention take advantage of grouping certain operations into a group (set or class) that results in efficient optimization of the operations. For example, certain flag producing operations ("P") can be: fusible ("Pf") or non-fusible ("Pn"). Fusible operations are eligible to be joined with other operations. An example of "Pf" is a simple non-fused arithmetic logic unit (ALU) operation, such as 'add' operation that produces flags. "Pn" operations are complex operations that produce flags but cannot be fused, such as the division operation, or already fused operations. Additionally, some flag producers (or operations that produce flags), such as those corresponding to certain x86 shift/rotate instructions, do not always produce flags. Such producers are referred to as "unsure".

Nopassert operations is an operation corresponding to assertion/branch based on certain flags. That is, in, for example, a multi-block trace, an interior or final branch prediction is represented by an assertion and a nopassert operation corresponds to such an assertion. Such as operation can be fused with some earlier "Pf" operation. Flag consumers ("C") are operations that consume flags. Examples of "C" operations include, but are not limited to, 'nopassert' and 'cmov' (conditional move). If a nopassert operation is fused and it consumes only flags that are produced by a flag producing operation, the resulting combined operation is then not considered a flag consumer.

Figure 6:
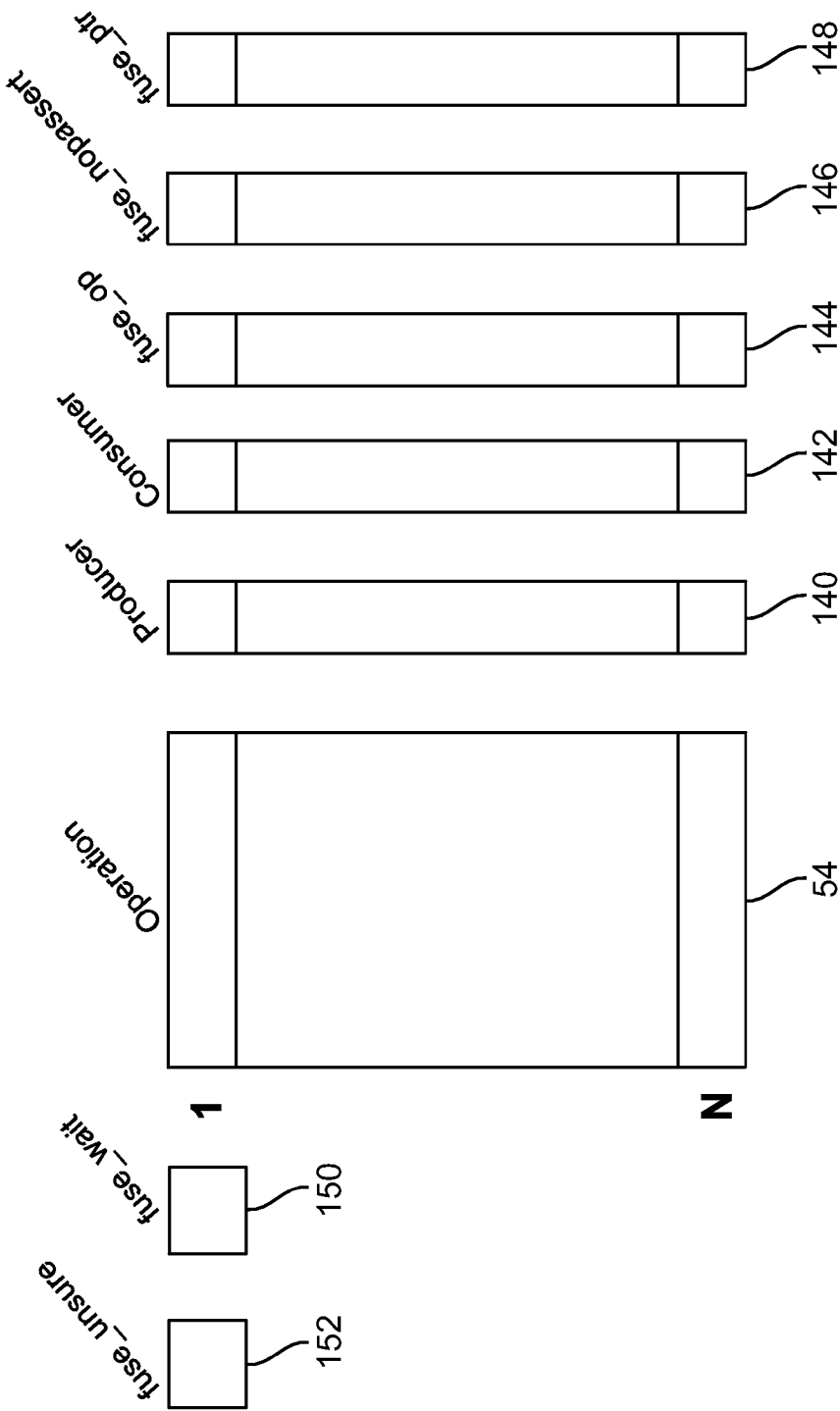
FIG. 6 shows the vectors included in the pre-optimization logic 52 as well as the input buffer 54.

FIG. 6 shows the vectors included in the pre-optimization logic 52 as well as the input buffer 54. The structures of FIG. 6 are exemplary flags (or "sets", "structures", "vector", "arrays", "sets"). FIG. 6 is shown to include a "producer" vector (Prod) 140, a "consumed" vector (Cons) 142, a "fuse_op" vector 144, a "fuse_nopassert" vector 146 and a "fuse_ptr" vector 148.

The producer vector (Prod) 140 is indicative of flag producing operations. A consumed vector (Cons) 142 is indicative of operations whose flags, if any, have been consumed. The fuse_op vector 144 is indicative of flag producing operations that have been fused with nopassert operations. The fuse_noassert vector 146 is indicative of nopassert operations that have been fused with flag producing operations. For each fused flag producing operation, its associated fuse_ptr of the fuse_ptr vector points to the location of a nopassert operation that is fused with a producer operation. The foregoing vectors each have N entries, with N being equal to the number of entries in the input buffer 54.

Also shown in FIG. 6, is a "fuse_wait" register 150 that stores the entry number of a fusible flag producer that has yet to be fused with a nopassert. If that flag producer is "unsure", a fuse_unsure register 152 is set (or activated).

The producer vector 140, the consumed vector 142, the fuse_op vector 144, the fuse_nopassert vector 146, the fuse_ptr vector 148, the fuse_wait register 150, and the fuse_unsure register 152 are initialized at the beginning of a trace prior to the processing of the first operation of the trace being optimized.

Figure 7:
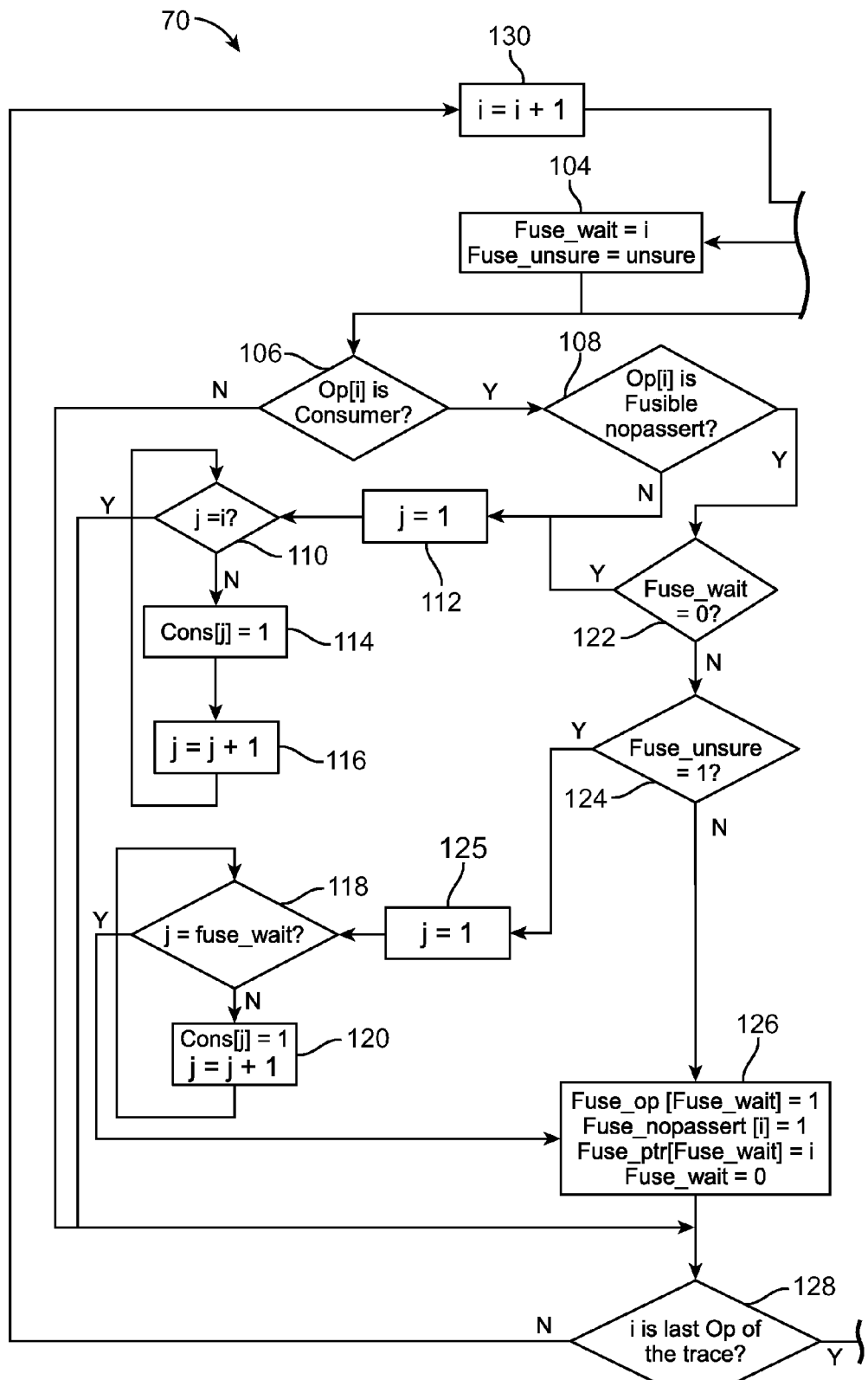
FIG. 7 shows a flow chart of the steps 70 that are generally performed by the preoptimization logic 52 when optimizing the received operations of a trace.
Figure 7:
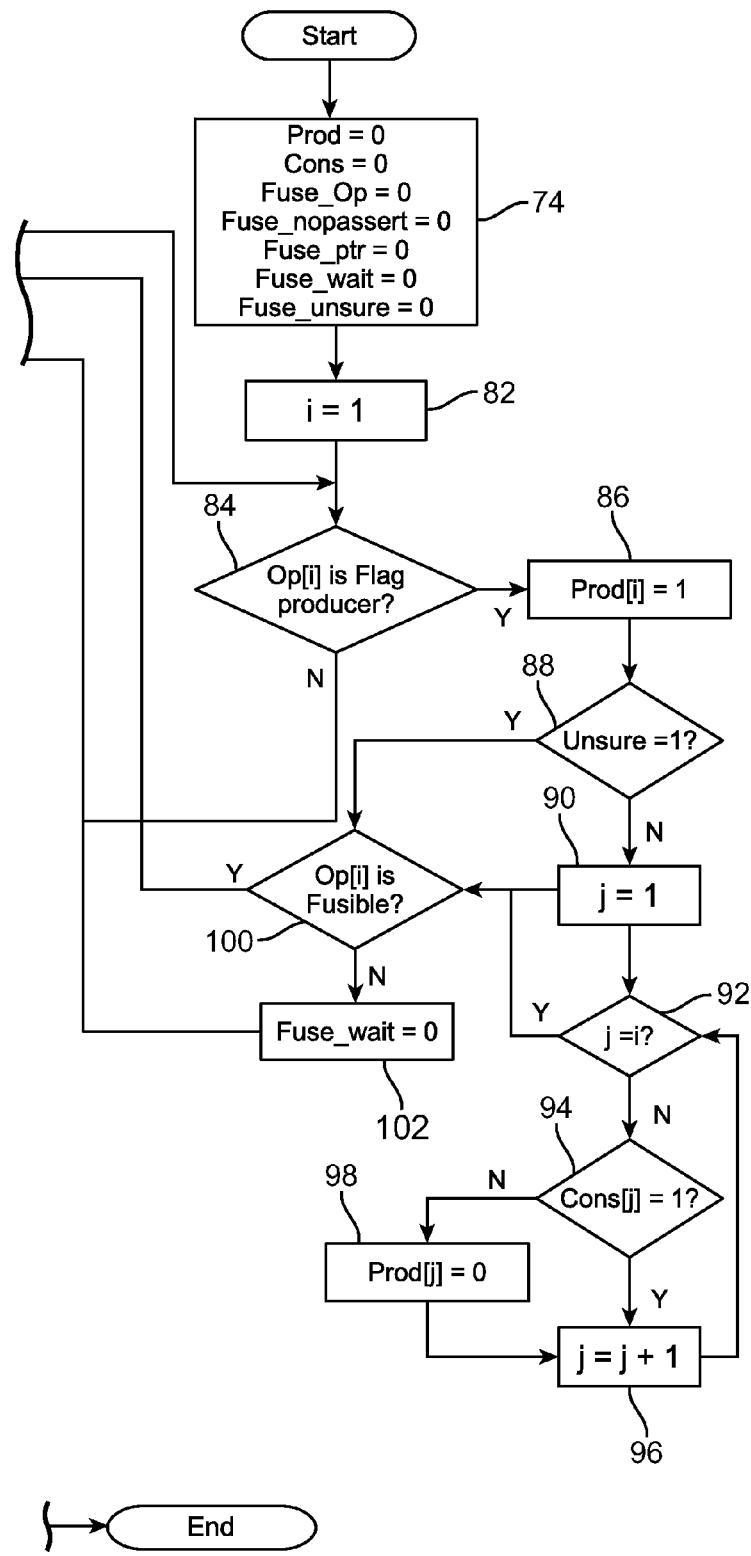

FIG. 7 shows a flow chart of the steps 70 that are generally performed by the preoptimization logic 52 when optimizing the received operations of a trace. During step 74, the preoptimization logic 52 for preoptimizing the operations of a current trace is initialized. Specifically, the producer vector 140, the consumed vector 142, the fuse_op vector 144, the fuse_nopassert vector 146, the fuse_ptr vector 148, the fuse_wait register 150, and the fuse_unsure register 152 are initialized to 0 at the beginning of a trace prior to the processing of the first operation of the trace being optimized.

After step 74, at step 82, i is set to one, and at 84 a determination is made as to whether or not, the current operation, as identified by the value of i, is a flag producer. "i" represents an index of an operation, as it is received and stored in the input buffer 54 and N represents the number of entries in the input buffer 54. If at 84 it is determined that the current operation is a flag producer, the process proceeds to step 86 where a bit corresponding to the operation i in the producer vector is set to one. If at 84, it is determined that the current operation is not a flag producer, the process proceeds to 106.

After step 86, at 88 a determination is made as to whether or not the current operation is an operation of unsure producer type and if so, the process continues to 100. If it is determined that the current operation is not an unsure producer type of operation, the process proceeds to step 90, where j is set to 1. "j" is an index to earlier operations, and it can be an integer value smaller than "i". After step 90, at 92 a determination is made as to whether or not i and j are equal, and, if not, a determination is made at 94 as to whether or not the consumed flag (Cons flag) is one (or activated) for an earlier entry j, and if not, at step 98 its producer flag (Prod flag (or indicator)) is cleared (or de-activated) for the earlier entry j at step 98, otherwise, at step 96, j is incremented by one and the process proceeds to 92 and proceeds therefrom in the manner discussed above. After the step 98, the process proceeds to step 96 and proceeds therefrom in the manner discussed above.

One set of operation is created by the steps 92-98, which is essentially made of operations that i) are earlier in the sequence of operations than the current operation, ii) have their associated producer indicator set, and iii) have their associated consumed indicator not set. All producer indicators associated with operations in this set are reset.

At 100, a determination is made as to whether or not the current operation is fusible, and if so, the step 104 is performed where fuse_wait is set to i and fuse_unsure is set to 1 if the current operation is of "unsure producer" type (if not, "fuse-unsure" is set to 0), indicating that the operation is of an unsure fusible type. Next, the process proceeds to 106.

If at 100, a determination is made that the current operation is not fusible, the process proceeds to step 102 where fuse_wait is set to zero (or reset). Next, the process proceeds to 106.

If at 92, a determination is made that j is equal to i, the process proceeds to 100 and continues as discussed above. If at 94, a determination is made that the current operation is not a consumer, the process proceeds to step 98. At step 98, the producer flag of the operation indexed by j is reset (or set to zero) and the process continues to step 96 where j is incremented by one and the process continues to 92.

It is noted that at step 98, flag elimination is performed, or, more specifically, the .cc is eliminated from the operation to which the index j points.

At 106, a determination is made as to whether or not the current operation is a consumer and if so, the process continues to 108, otherwise, the process proceeds to 128.

At 108, a determination is made as to whether or not the current operation is a fusible nopassert, and, if not, the process continues to step 112. If the current operation is a fusible nopassert, the process continues to 122. At step 112, j is set to one and next, at 110, a determination is made as to whether or not j is equal to i and if so, the process proceeds to 128, otherwise, the process continues to step 114 where the consumed flag for the operation indexed by j is set to one (or "asserted" or "activated"). Next, at step 116, j is incremented by one and the process proceeds to 110 and continues as discussed above.

Another set of operations is formed during the steps 110-116 and includes operations that are earlier in the sequence of operations than the current operation. The consumed indicator, associated with each operation, if not already activated, is activated.

If at 108 it is determined that the current operation is a fusible nopassert, the process proceeds to 122 where a determination is made as to whether or not the fuse_wait register (or indicator or pointer) is set to zero (or reset), and, if so, the process proceeds to step 112, otherwise, the process continues to step 124 where a determination is made as to whether or not the fuse_unsure register is set and if so, the process proceeds to step 125 where j is set equal to one and the process continues to 118. If at 124, it is determined that fuse_unsure is not set, the process proceeds to step 126 where fusing of the operations indexed by i and fuse_wait is performed. More specifically, the fuse_wait points to the operation, which is the flag producer operation, and that is fused with a fusible nopassert ('i'). At step 126, the fuse_op flag, indexed by fuse_wait, is set to one and as is the fuse_nopassert flag, indexed by i. The fuse_ptr, indexed by the fuse_wait flag, is set to the current value of i and the fuse_wait flag is reset (or set to zero).

At step 125, j is set to one and next, at 118, a determination is made as to whether or not j is equal to fuse_wait register and if so, the process proceeds to 126, otherwise, the process continues to step 120 where the consumed flag for the operation indexed by j is set to one (or "asserted" or "activated"). Next, at step 121, j is incremented by one and the process proceeds to 118 and continues as discussed above. The steps of 125, 118, 120 and 121 form another set of operations.

At 128, a determination is made as to whether or not i points to the last operation of the trace and if so, the process ends, otherwise, at step 130 i is incremented and the process continues to 84 and proceeds as discussed above.

When, in pre-optimization, all flag optimization and fusing opportunities for a particular operation are exhausted, the operation can be exposed to subsequent optimization stages (or phases), such as done by optimization logic 56. An operation is exposed when its corresponding producer flag (Prod) is clear or when its corresponding consumed flag (Cons) is set. Also, if the last operation of the input trace has been stored in the input buffer 54 (end-of-trace), all remaining unexposed operations are exposed. Additionally, a fusible flag producing operation cannot be expose prior to the arrival of its corresponding fusible nopassert (or end-of-trace).

A set of exposed operations includes zero more exposed operation.

It is noted that pre-optimization, i.e. processing performed by the pre-optimization logic 52, and optimization, i.e. processing performed by the optimization logic 56 may overlap. That is phases or stages of such processing can be overlapped, at least in part. That is, optimization of the sequence of operations of the trace being optimized occurs as a stage in processing the sequence of operations in two or more stages, i.e. the pre-optimization stage (or phase) and the optimization stage (or phase) that are overlapped at least in part. Once a particular operation is exposed, then that particular operation is available for processing by one or more of the other stages.

An exposed operation is read out from the input buffer 54 and sent to the optimization logic 56 for further optimization. The order of operations that were input to the pre-optimization logic 52 is maintained except that the fused operations are treated in a special manner. A normal exposure is overridden after a fused flag producer is exposed. Instead, the corresponding fused nopassert is exposed (out of order) and read from the input buffer in the following cycle. Exposure takes place as it does in order, for the following cycles, continuing with the operation after the original flag producing operation except that, the already fused nopassert is discarded. Alternatively, nopassert need not be stored in the input buffer 54. Instead, when a fusing opportunity is identified, a resulting fused operation overwrites the fused flag producer's entry in the input buffer 54.

The flow chart of FIG. 7 refers to a set of architectural flags, such as, an overflow flag (OF), set flag (SF), zero flag (ZF), auxiliary flag (AF), parity flag (PF) and/or carry flag (CF). The pre-optimization logic 52, in an exemplary embodiment, uses multiple flag groups (or subsets). In one embodiment, two flag groups (or subsets) are employed, i.e. "Prod5" and "ProdC" and used instead of the earlier described Prod (or producer). An operation having (or with) .cc (condition code) is marked as a producer in the Prod5 and/or ProdC flag groups.

An asserted (or activated) bit in the Prod5 vector indicates that the operation to which the bit corresponds modifies (or may modify) some or all of the following flags, the overflow flag (OF), set flag (SF), zero flag (ZF), auxiliary flag (AF), and/or parity flag (PF). An asserted (or activated) bit in the ProdC vector indicates that the operation modifies (or may modify) the carry flag (CF). If the Prod5 or ProdC bit remains asserted (or activated) when the operation is read from the input buffer 54, the operation remains a .cc operation. If the Prod5 and ProdC bits are both cleared (or deasserted or deactivated) before the operation is read from the input buffer 54, the operation's .cc field is cleared.

In an exemplary embodiment, Prod5 is asserted for all .cc operations except the bit test operation ("band"). ProcC is asserted for all .cc operations except for the following operations: increment ("inc"), decrement ("dec"), and conditional move ("cmov").

An example is now provided of the assertion or activation of a Prod5 and/or ProdC vectors (or arrays), as they are affected by the operations indicated:

add.cc//Prod5+ProdC operation inc.cc//Prod5-only operation band.cc//ProdC-only operation An add.cc operation sets the bits in the Prod5 and ProdC vectors at a position corresponding to its location. A following 'inc.cc' operation clears the 'add' operation's Prod5 bit. A following 'band.cc' operation clears the 'add' operation's ProdC bit. When the 'add.cc' is read from the input buffer, the .cc field is cleared to optimize the 'add.cc' to a regular 'add' operation.

Certain flag consuming operations, such as Cons5 consumers, consume some or all of the following flags: the overflow flag (OF), set flag (SF), zero flag (ZF), auxiliary flag (AF), and/or parity flag (PF). Certain flag consuming operations, such as ConsC consumers, consume the carry flag (CF). In alternative embodiments, the breakout of consumers and producers may be different than that which is disclosed.

If an operation is a Prod5 type of producer, this causes setting or activation of its Prod5 flag (or indicator) and resetting (or de-activating) of Prod5 flags of all earlier operations for which Cons5 flag is not set (or activated).

If an operation is a Cons5 type of consumer, this causes setting (or activating) Cons5 flags (or fields or indicators) of all earlier operations.

If an operation is a ProdC type of producer, this causes setting of its associated ProdC flag (or indicator) and resetting of the ProdC flags (or indicators) of all earlier operations for which the ConsC flag is not set (or activated).

If an operation is a ConsC type of consumer, this causes setting the ConsC flags (or fields) of all earlier operations.

An operation is exposed if a) its Prod5 flag is cleared or Cons5 flag is set; and b) its ProdC flag is cleared or ConsC flag is set. Also, if the last operation of the trace has been stored (or held) in the input buffer 54 (i.e. end of trace), all unexposed operations are exposed.

If the Prod5 flag (or bit) or ProdC flag (or bit) remains asserted (or activated or set) when the operation is read from the input buffer 54, it remains a .cc operation. If the Prod5 and ProdC flags (or bits) are both cleared (or de-asserted or de-activated) before the operation is read from the input buffer 54, the operation's associated .cc field (or flag) is cleared.

In some embodiments, nonadjacent operations are fused by the pre-optimization logic 52 and multiple fusing opportunities are advantageously recognized and exploited on a per trace basis. For example, in a multi-block trace, multiple fusing is advantageously done across traces comprising the multi-block trace.

An example is provided now, relative to Tables 1, 2 and 3, below. In the example, operation, op[1], is a Pn type of operation, operation, op[2], is a Pf type of operation, operation, op[3], is an operation that is not a producer or a consumer, operation, op[4], is a nopassert type of operation, operation, op[5], is a Pn type of operation and the last operation, op[6], operations are a consumer operation. The flag producing operations of this example, are all of the type that produce flags (or not of an unsure flag producer type).

Columns [1] through [6] of the Tables 1, 2 and 3 provide the pre-optimization state of bits/flags/indicators/vectors after each operation is processed except for fuse_wait.

This example illustrates the following:
  op[2] removing .cc from op[1],
  non-adjacent fusing of op[2] and op[4],
  op[5] removing .cc from the fused op,
  a set of exposed operations ("Exp");

TABLE 1

| Ops | | [1] | [2] | [3] | [4] | [5] | [6] |
|---|---|---|---|---|---|---|---|
| [1] | Pn | cc | | | | | |
| [2] | Pf | | cc | cc | cc | | |
| [3] | Op | | | | | | |
| [4] | NopAssert | | | | fuse[2] | fuse[2] | fuse[2] |
| [5] | Pn | | | | | cc | cc |
| [6] | C | | | | | | |

TABLE 2

| | | Prob/Cons/Exp: | | | | | |
|---|---|---|---|---|---|---|---|
| | | [1] | [2] | [3] | [4] | [5] | [6] |
| [1] | Pn | 100 | 001 | 001 | 001 | 001 | 011 |
| [2] | Pf | 000 | 100 | 100 | 100 | 001 | 011 |
| [3] | Op | 000 | 000 | 001 | 001 | 001 | 011 |
| [4] | NopAssert | 000 | 000 | 000 | 000 | 001 | 011 |
| [5] | Pn | 000 | 000 | 000 | 000 | 100 | 111 |
| [6] | C | 000 | 000 | 000 | 000 | 000 | 001 |

Table 2 shows the affects the operations of this example have on the producer and consumer vectors and the exposure vector although the latter is not a physical table but optionally be one.

TABLE 3

| | | Fuse_op/Fuse_nopassert/Fuse_ptr: | | | | | |
|---|---|---|---|---|---|---|---|
| | | [1] | [2] | [3] | [4] | [5] | [6] |
| [1] | Pn | 000 | 000 | 000 | 000 | 000 | 000 |
| [2] | Pf | 000 | 000 | 000 | 104 | 104 | 104 |
| [3] | Op | 000 | 000 | 000 | 000 | 000 | 000 |
| [4] | NopAssert | 000 | 000 | 000 | 010 | 010 | 010 |
| [5] | Pn | 000 | 000 | 000 | 000 | 000 | 000 |
| [6] | C | 000 | 000 | 000 | 000 | 000 | 000 |
| Fuse_wait: | | 0 | 2 | 2 | 0 | 0 | 0 |

Table 3 shows the affects the operations of this example have on the fuse_op and fuse_nopassert vector and the fuse_ptr and fuse_wait.

The program order of some consumers is preserved, preventing them from being fused out of order (examples of this are operations corresponding to final branch predictions) in order to preserve the program order of the consumer after fusing. Such consumers are referred to as consumer ordered type. The relative program order (sequence of operation order) of the operation is preserved.

One set of operations are all earlier operations that have their producer flag deactivated and another set of operations are all earlier operations that have their consumed flag activated.

Figure 8:
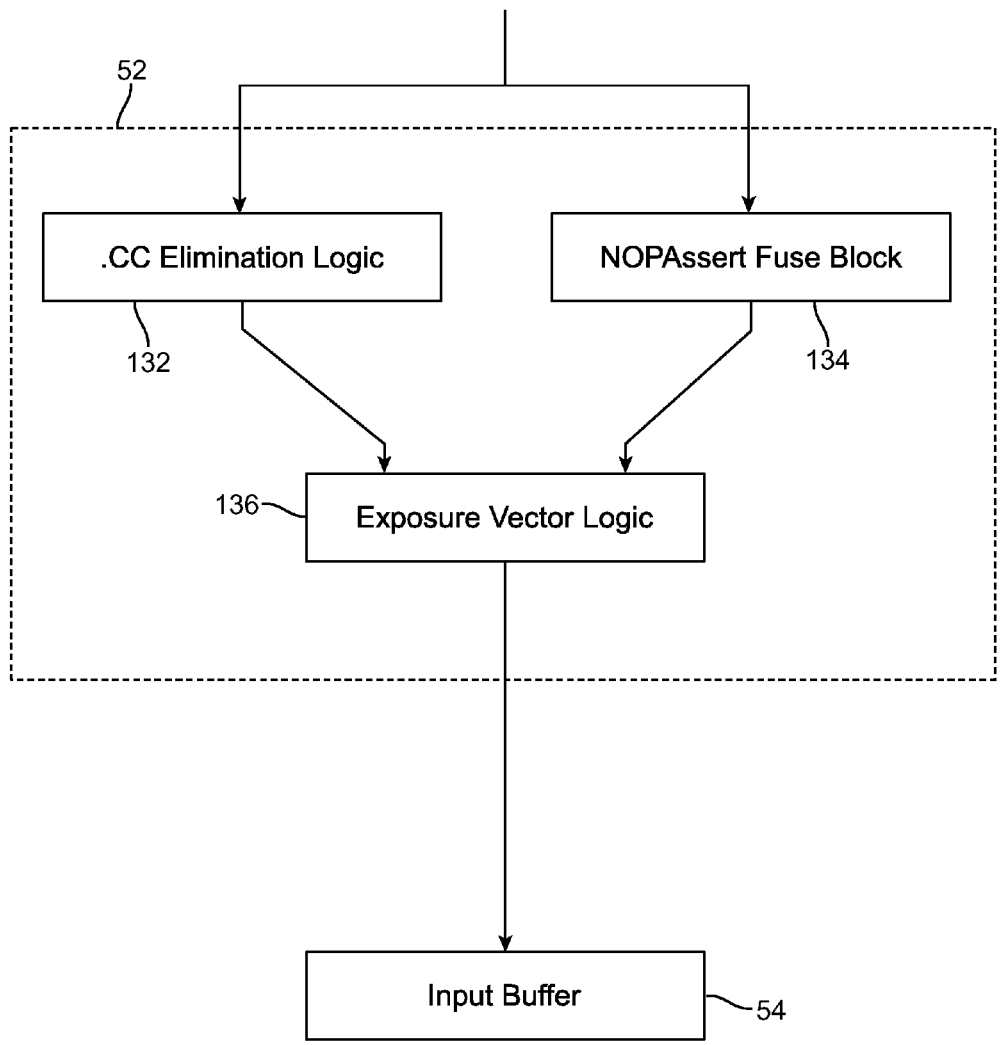
FIG. 8 shows further details of the optimization logic 56, in accordance with an embodiment of the present invention.

FIG. 8 shows further details of the optimization logic 56, in accordance with an embodiment of the present invention. The optimization logic 52 is shown to include a .cc elimination logic 132, a nopassert fuse block 134 and exposure vector logic 136. The logic 132 and the logic 134 receive operations of a trace. 'Logic' refers to 'circuit' or 'block'. The .cc elimination logic 132, which is a flag elimination block, removes .cc or flags, to the extent possible, and as described above, from operations being received during the preoptimization phase. The logic fusing operations to further optimize operations, in the manner discussed above. The result of the logics 132 and 134 are provided to the logic 136.

Optimization is further performed by the optimization logic 56, in various forms and stages. For example, the optimization logic 56 prepares the operations for further optimization, performs merge removal, performs symbolic renaming and performs load elimination. It is noted that while all of the foregoing stages are discussed herein, any combination thereof is contemplated. Furthermore, preoptimization, as performed by the preoptimization logic 52 and optimization, as performed by the optimization logic 56, may be overlapped (or pipelined) at various stages. It is understood that while the preoptimzation logic 52 is stated to "preoptimize" operations, this is a form of optimization. Accordingly, functions of the preoptimzation logic 52 and the optimization logic 56 serve to optimize the operations of a trace. In fact, this is advantageously done "on the fly", that is, as operations of a trace are received by the preoptimization logic 52, they are optimized without waiting for receipt of all of the operations of the trace.

The optimization logic 56 operates on the operations (and their associated constants) in the input buffer 54 to perform certain transformations thereon that can reduce the number of operations and latency for the trace. The transformed operations can be stored temporarily while further optimization is performed; then the optimized operations are emitted to the schedule buffer 58. Operations that are stored in the schedule buffer 58 are referred to as being "emitted" thereto. Operations that are stored in the input buffer 54 are "exposed" to the optimization logic 56 and the optimization logic 56 emits operations to the schedule buffer 58. Exposed operations may result in further optimization, as performed by the optimization logic 56, and they are exposed only after all flag optimizations thereon have been performed or exhausted and all fusing opportunities have been exhausted.

Referring back to FIG. 5, operations with associated constants from the schedule buffer 58 are scheduled and ordered to form an efficient representation that observes restrictions on operation slotting and constant size for the OpT format. The resulting OpT representation is combined with additional fields required to form a basic block cache entry in an output buffer 62. The optimized operations are then included in the basic block cache and sent from the output buffer 62 to the basic block cache circuit 22. In the case where a multi-block trace is being built and optimized, the operations are sent by the multi-block builder circuit 34 to the multi-block cache circuit 26.

To summarize, in the optimize phase, the optimization logic 56 reads operations from the input buffer 54, performs certain transformations to optimize the operations, and writes (or "emits") the resulting operations to the schedule buffer 58. In one embodiment, the transformations enable optimizations of folding constants, fusing operations, eliminating dead code, and eliminating load operations, as described below.

As operations are exposed, they are read from the input buffer 54 and sent to the optimization logic 56, which looks for patterns that match the operation and its input source operands (or "register" or "pointerts to constants"), and applies the highest priority matching transformation. The transformed operation is then generally stored in the register table (later shown as register table 510) at an entry that corresponds to the destination register of the operation. An operation in the register table can be further optimized before it is eliminated or written to the schedule buffer. An example of this process is described below, which is then followed by more detail on the operation.

Figure 9:
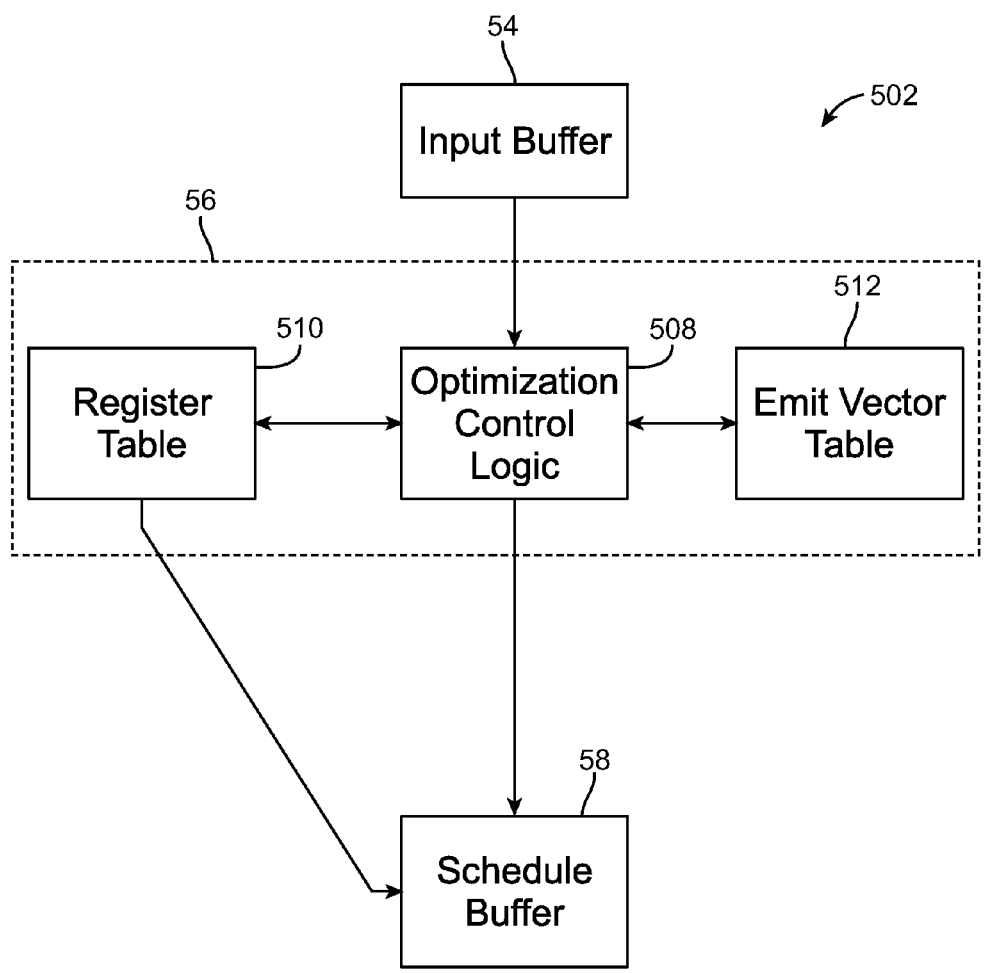
FIG. 9 shows an optimization phase including further details of the optimization logic, in accordance with an embodiment of the present invention.

FIG. 9 shows an optimization phase including further details of the optimization logic, in accordance with an embodiment of the present invention. More specifically, the optimization phase 502 is shown to include the input buffer 54, the optimization logic 56 and a schedule buffer 58, in accordance with an embodiment of the present invention. The optimization phase 502 optimizes operations of a trace as the operations of the trace are received. The trace may instead be a basic block trace, in which case the basic block builder circuit 20 performs the functions of the optimization phase 502 or a multi-block trace in which case the multi-block builder circuit 34 performs the functions of the optimization phase 502. The optimization logic 56 is shown to include, an optimization control logic 508, a register table 510 (which is also known as "Pending Operation Register Table (PORT)"), and an emit vector table 512 (also known as "Register Precedence Matrix (RPM)").

There is a trade off as to the duration of time for an operation is maintained in the input buffer 54. That is, the longer the operation is maintained in the input buffer 54, the more optimization performed on the operation but the slower the optimization process. To aid in determining the length of time that an operation remains in the input buffer 54, in a manner that is most effective for optimizing it, performance heuristics may be employed. That is, performance heuristic is used to as an indicator of when an operation is to be removed from the input buffer 54.

The register table 510 is shown coupled to the optimization control logic 508, and the optimization control logic 508 is shown coupled to the emit vector table 512. The optimization control logic 508 is shown coupled to the schedule buffer 58 and the register table 510 is shown coupled to the schedule buffer 58.

In FIG. 9, the input buffer 54 stores operations passed from the pre-optimization logic 52. The operations are read from the input buffer 54, one at a time (the "working operation"), by the optimization control logic 508 of the optimization logic 56. As the working operation is read from the input buffer 504 by the optimization control logic 508, the latter performs optimizations on the working operation, as will be described relative to FIG. 15.

Following the symbolic renaming optimization of optimization logic 56, the working operation is, at times, posted to the register table 510 as an entry corresponding to the destination register of the working operation. That is, the working operation may be emitted directly by the optimization logic 56 to the schedule buffer 58 or posted to the register table 510. Substantially simultaneously, the entry for the corresponding register table 510, in the emit vector table 512, is modified by the optimization control logic 508. Depending on the outcome of the optimization performed on the working operation, by the optimization control logic 508, the working operation may be emitted from either of the register table 510 or the optimization control logic 508, to the schedule buffer 58.

Working operations have associated destination register, i.e. the destination that the working operation will be modifying. Working operations may have associated source registers, although some do not have any source registers.

The input buffer 54 serves to store (or hold) the operations following the pre-optimization logic 52 allowing the pre-optimized operations to be further optimized by the optimization logic 506. The optimization logic 56 is a form of "hardware compiler" permitting operations that are read from the input buffer to be optimized "on-the-fly" or in real-time. In contrast to software compilers however, the hardware compiler of the various embodiments of the present invention, such as those comprising the basic block builder circuit 20 or the multi-block builder circuit 34, compiles only that which is needed for execution. Furthermore, it compiles beyond the decoder circuit 18.

More specifically, the optimizations performed on the operations read from the input buffer 504 result in new combinations of operations and reductions in the number of operations required by the processor, thereby enhancing the speed of the processor. The register table 510 enhances optimization by storing (or holding), as its entries, "symbolic expressions", for each register, during the optimization process. Each entry of the register table corresponds to a subset of registers to be operated thereon. Each symbolic expression is associated with at least one of the subset of registers. Each entry represents a symbolic expression of the value that is currently (in program order) in its corresponding register.

A symbolic expression is made of one or more operations and zero or more operands. Symbolic expressions may be limited by design choices. Examples of such limitations include a limitation on the number of operands (each operand represents a source register or constant) that are in the expression and/or a limitation on the number of operations represented in the expression. Other limitations include limiting the number of constant operands, limiting which operands hold a constant and/or limiting the number of operands and/or source registers based on the operation type.

The emit vector table 512 is a matrix of indicators that stores (or holds) the "emit vectors" (also known as "dependency indicators") for each entry in the register table 510. "Emit vectors" are a series of vectors (or arrays) that store a bit (or flag or indicator) relative to the order in which the symbolic expressions, stored in the register table, are sent to the schedule buffer 58 ("emitted") and they do so relative to each other. Therefore operations to be emitted to the schedule buffer 58, are emitted in a specific numerical order, thereby allowing for additional optimizations to be performed on the operations.

Figure 10:
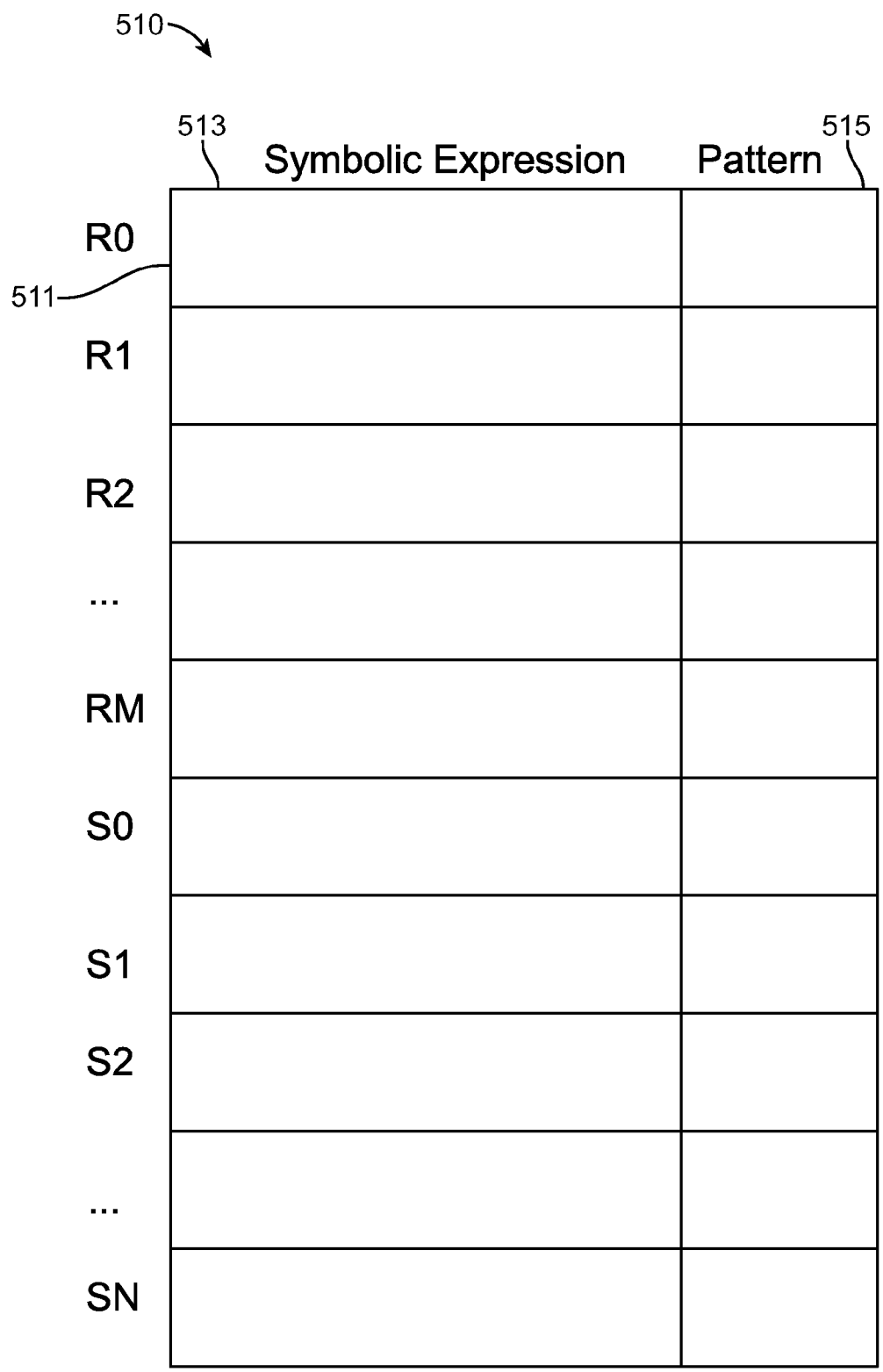
FIG. 10 shows an optimization phase including further details of the optimization logic, in accordance with an embodiment of the present invention.

FIG. 10 shows the contents of the register table 510, in accordance with an exemplary embodiment of the present invention. The register table 510 is shown to have rows 511, a "symbolic expression" column 513, and a "pattern" column 515. The symbolic expression column 513 includes the symbolic expression, if any, for each of the registers R0-RM and S0-SN. In one case, the registers R0-RM are architectural registers and M is 16 and the S0-SN are scratch registers and N is 8 totaling 24 registers. It is understood that any number of registers and any combination of scratch/architectural registers may be employed.

Generally, the number of rows 511 is equal to the number of registers present in the processor (or instruction processing circuit). For each row 511, there are two entries corresponding to the "symbolic expression" column 513 and the "pattern" column 515. The pattern column 515 includes the pattern, if any, corresponding to registers. "Symbolic expression" is an entry that is formed in each row 511 by the "symbolic expression" column 513 and is a symbolic expression of the register to which the row 511 corresponds. By way of example, the row 511 "r0" contains the symbolic expression in the "symbolic expression" column 513 for the register r0. The "pattern" entry formed in each row 511 by the "pattern" column 515 contains an entry for a "pattern code." A "pattern code" identifies the type of symbolic expression with which it is stored. Pattern codes are stored in the register table 510, in the pattern column 515, in accordance with an embodiment of the present invention. A pattern code corresponds to one or more source registers of a symbolic expression.

The register table 510 serves as a storage for operations passed through the optimization logic 56 for which the optimization control logic 508 has performed some form of optimization. While stored in the register table 510, the symbolic expression for a register may be further optimized by the combination of a subsequent working operation written to the register table, thereby reducing the number of operations sent for execution while retaining the same results. The "symbolic expression" column 513 stores a symbolic expression for each register containing the operation and combined operations that will later be applied to the contents of the corresponding register. If there is no symbolic expression posted to the register table for a specific register, the entry in the row 511 of the register table 510 corresponding to that register is set equal to the current value of the register (or an "invalid" setting or "identity expression"). When an entry is "invalid," no operation is emitted to the schedule buffer 514 for that register. The default entry for each entry in the register table 510 is "invalid." Invalid, as used herein, is also referred to as an identity expression or setting the register value equal to itself.

The "pattern" column 515 stores an "n"-bit "pattern code" assigned by the optimization control logic 508 corresponding to a predetermined pattern for each source register of the working operation, where the number of predetermined patterns encoded into the optimization control logic 508. The predetermined patterns represent common combinations and types of operations encoded into the optimization control logic 508 is less than or equal to $2^n$. The predetermined patterns characterize the types of symbolic expressions encoded into the optimization control logic 508. For example, a pattern code of "0" may be applied where a source register's operation makes use of a constant, whereas a pattern code of "1" may be applied where the source register's operation is an add operation. The optimization control logic 508 assigns a predetermined pattern code to each of the source registers in the working operation. When decoding the contents of the register table 510, the pattern codes stored in the pattern column 515 enhance the speed of decoding by indicating the type of symbolic expression found in the register table 510 entry.

In alternate embodiments of the present invention, the register table 510 may not have a pattern column 515.

Figure 11:
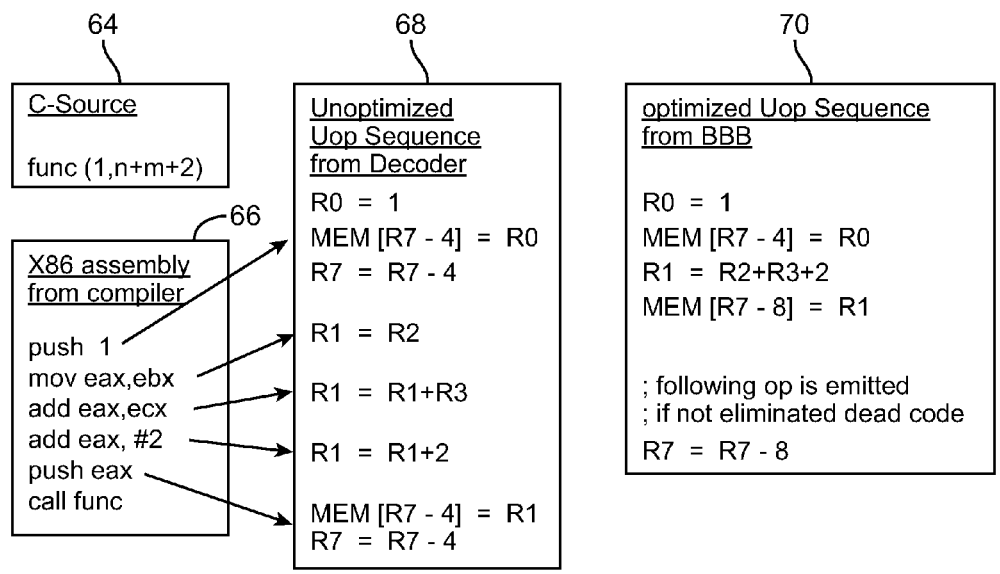
FIG. 11 illustrates an example of code (instructions/operations) for passing parameters to a called function.

FIG. 11 illustrates an example of code (instructions/operations) for passing parameters to a called function, including the high-level source code 64, assembly code 66 for an x86 microprocessor produced by a compiler, unoptimized operation sequence 68 produced by the decoder circuit 18, and optimized operation sequence 70 produced by the basic block builder circuit 20. As shown, 7 unoptimized operations have been reduced to 4 optimized operations thereby reducing the number of operations. Moreover, operation dependencies have been removed and replaced with the symbolic expression R2+R3+2, which results in an independent operation that can be executed in parallel with other operations thereby increasing performance.

FIG. 12 illustrates the contents of registers, as working operations are optimized by the optimization logic, and symbolic expressions resulting therefrom, in accordance with an exemplary embodiment of the present invention.

Initially, there are no pending operations in the PORT. This is illustrated by having each register store its identity value; that is, each register takes a value equal to itself. This condition for a PORT entry is also called an "invalid" operation. The micro-operation from the input buffer 54 that BBB is currently processing is called the "WorkingOp."

The optimizing logic 56 reads the first WorkingOp (or working operation), then updates the symbolic expression, corresponding to the register used by the operation, to record that a pending operation assigns R0 to the constant value 1. The second WorkingOp stores the value of R0 to memory at the location determined by the contents of R7 minus 4. This operation modifies memory, and consequently cannot be held pending in the register table 510. The optimization logic 56 therefore first emits (writes to the schedule buffer 58) the pending operation that modifies R0, then emits the stored operation. The optimization logic 56 also updates the register table 510 to record that no operation is pending for R0. The optimization logic 56 then processes the third input operation, and records the pending modification to R7 in the register table 510. The fourth input operation stores the contents of R2 into R1, and this is indicated in register table 510 by updating the entry for R1 to record that it takes on the value of R2.

The fifth input operation specifies that R1 should be modified to the sum of the contents of R1 and R3. The optimization logic 56 determines that an operation is pending for the source operand R1, transforms the WorkingOp to an operation that sums R2 and R3, then stores that operation in the register table 510 as pending for R1. Notice that the fourth input operation is no longer pending in the register table 510; nor has it been written to the schedule buffer; that operation has been eliminated as dead code. The sixth operation modifies R1 by adding the constant 2 to the contents of R1. The register table 510 determines that this operation matches a rule (or pattern) that transforms (or is applied) to a fused operation for successive additions, and updates the register table entry for R1 accordingly. The fifth operation was also overwritten in the register table 510, and consequently eliminated as dead code. Processing for the seventh operation is similar to that of the second operation except that R1 is the expression for this operation. For the eighth operation, the optimization logic 56 determines that the operation matches a rule that allows constant folding for R7, and updates the register table 510 accordingly. Thus, the optimization logic 56 has reduced the original sequence of 8 operations formed by the decoder circuit 18 (also known as "instruction decoder (ID)") to 4 or 5 operations, depending on whether the pending operation for R7 is eliminated when the optimization logic 56 processes subsequent WorkingOps.

Several techniques can be used to enable the optimization logic 56 to determine matching rules quickly. First, the decoder circuit and pattern (rule)-matching logic in the optimization logic 56 can be designed together carefully to limit the number and format of patterns that must be detected for the most common and effective optimizations. Second, the optimization logic 56 itself can select transformations that make subsequent pattern matches simpler to perform for pending operations. Third, the register table 510 entries can store auxiliary information that explicitly represents characteristics of posted symbolic expressions that are most critical to the pattern matching circuitry. The auxiliary information is in the form of the pattern codes discussed in FIG. 9. The optimization control logic 508 uses the pattern codes to find an optimization rule that matches the working operation. Since the pattern codes for each source register are read instead of the entirety of the source register operation, the matching of a working operation to an optimization rule can occur rapidly. For example, in one embodiment, each register table entry is augmented with a 4-bit pattern field that represents the following information about a symbolic expression in respective entry:

Pattern[0]: the pending operation uses a constant.
Pattern[1] & Pattern[2]: the pending operation is add or fused addadd, and thus supports special add and memory addressing transformations.
Pattern [2]: the pending operation ends with an arithmetic, not logical, operation.
Pattern [3]: the pending operations is fused, which excludes it from many transformations.

Figure 13:
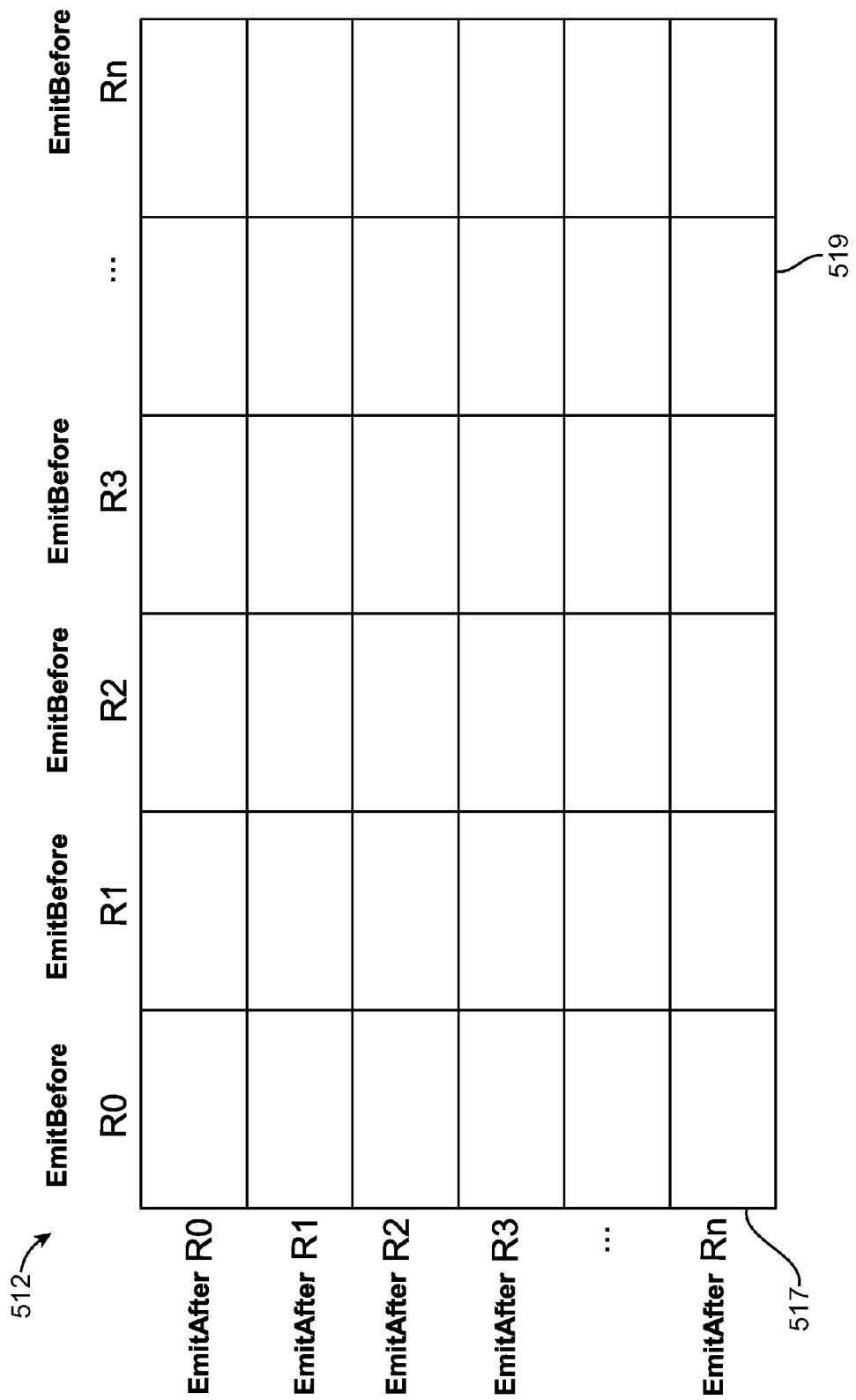
FIG. 13 shows an emit vector table 512 of the optimization logic 506, in accordance with an exemplary embodiment of the present invention.

FIG. 13 shows an emit vector table 512 of the optimization logic 506, in accordance with an exemplary embodiment of the present invention. The emit vector table 512 is shown to be a table made of rows 517 and columns 519. The number of rows 517, n, is equal to the number of columns 519, n, with each row and column representing a register. Thus, the number of rows and columns is typically equal to the number of registers in the processor including a builder, such as the builder 20.

In an exemplary embodiment, there are 24 of rows 517 and 24 of columns 519, totaling 576 entries. Each row 517 corresponds to the "EmitAfter" (emit) vector for an entry in the register table 510. The "EmitAfter" vector is a collection of single bit entries (a "vector") for each register table 510 entry corresponding to a register. At each point in the table where the column 517 intersects with a row 519 (an "intersection" or "diagonal"), there is a corresponding register table 510 entry represented on the EmitBefore (emit) vector along the column 519 and a corresponding register table 510 entry represented on the EmitAfter vector along the column 517. In one embodiment of the present invention, the value of the intersection is represented as a single bit that can only be "1" or "0." Where a value of "1" is entered into an intersection, the register table 510 entry of the corresponding row 517 would emit to the schedule buffer 514 chronologically after the register table 510 entry of the corresponding column 519. The EmitBefore vectors demonstrate that where the value of an intersection is "1," the register table 510 entry, represented by the corresponding column 519, will emit to the schedule buffer 58 chronologically before the corresponding register table 510 entry represented by the row 517.

The emit vector table 512 serves to ensure that the operations posted within the register table 510 are emitted to the schedule buffer 58 in a specific order so as to preserve any dependencies amongst the operations that could not be eliminated amongst the operations during optimization. The preservation of the dependencies ensures that the resultant (or transformed) operations produce the correct result when performed on the information stored in the registers. In some embodiments of the present invention, the value of an intersection of the column 519 and the row 517 corresponding to the same register table 510 entry is set to "1". Following the successful emit of a register table 510 entry to the schedule buffer 514, the values of the intersections for the register table 510 entry are all reset to a "0" state, in one embodiment of the present invention. Stated differently, the entries of the emit vector for the register corresponding to the emitted symbolic expression are removed.

Figure 14:
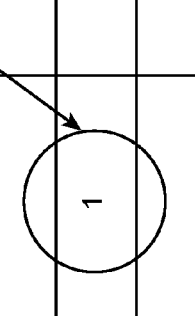
FIG. 14 illustrates an exemplary emit vector table 512 (also known as "Register Precedence Matrix (RPM)").

FIG. 14 illustrates an exemplary emit vector table 512 (also known as "Register Precedence Matrix (RPM)"). The emit vector table 512 serves as an additional structure used to ensure that the optimization logic 56 emits pending operations from the register table when necessary and in correct order. The emit vector table 512 records information that the optimization logic 56 uses during the optimization phase to ensure that a first pending operation is emitted before any pending or future operations are emitted for source registers of that first pending operation. For example, consider the following sequence of operations:

$R1=R2+R3;$   op1

$R2=R2+1;$   op2

The optimization logic 56 emits op1 before op2 to calculate the correct result because there is Write-After-Read (WAR) dependency for R2 between op1 and op2. This is represented in the emit vector table 512 by setting to 1 the bit at the intersection of the row for R2 and the column for R1. The bits that are 1 in a row indicate pending operations for the associated register that must be emitted before the associated register's pending operation; that is, the row represents a vector of predecessors of that register. Similarly, the bits that are 1 in a column associated with a register indicate pending operations that must be emitted after a pending operation for the associated register; the column represents a vector of successors of that register. In order for the optimization logic 56 to perform the optimization phase efficiently, it is necessary to maintain the complete precedence relationships for each register in its associated columns and rows. In some embodiments, the optimization logic is such that the emit vector table 512 diagonal is stored, and is set to one if a register uses itself as a source. This makes it easier for an optimization to recognize what sources it is indirectly using from the register table. To ensure that all other uses of the emit vector table 512 behave as desired with this change, the diagonal is only read when getting the "EmitBefore" vector for an entry. When reading the "EmitAfter" vector for an entry, the diagonal always reads as 0, regardless of what is stored at the diagonal.

The optimization logic 56 must also avoid a potential problem with the emit vector table 512: the presence of inconsistent, or circular, dependencies. For example, consider the following sequence of operations:

$R1=R2+R3;$ op1

$R2=R1+1;$ op2

Op1 requires that the operation to modify R1 be emitted before any modification to R2, but Op2 requires that the operation to modify R2 be emitted before any modification to R1. The optimization logic 56 detects the potential for such inconsistent precedence constraints, and takes certain actions to avoid such a problem.

Figure 15:
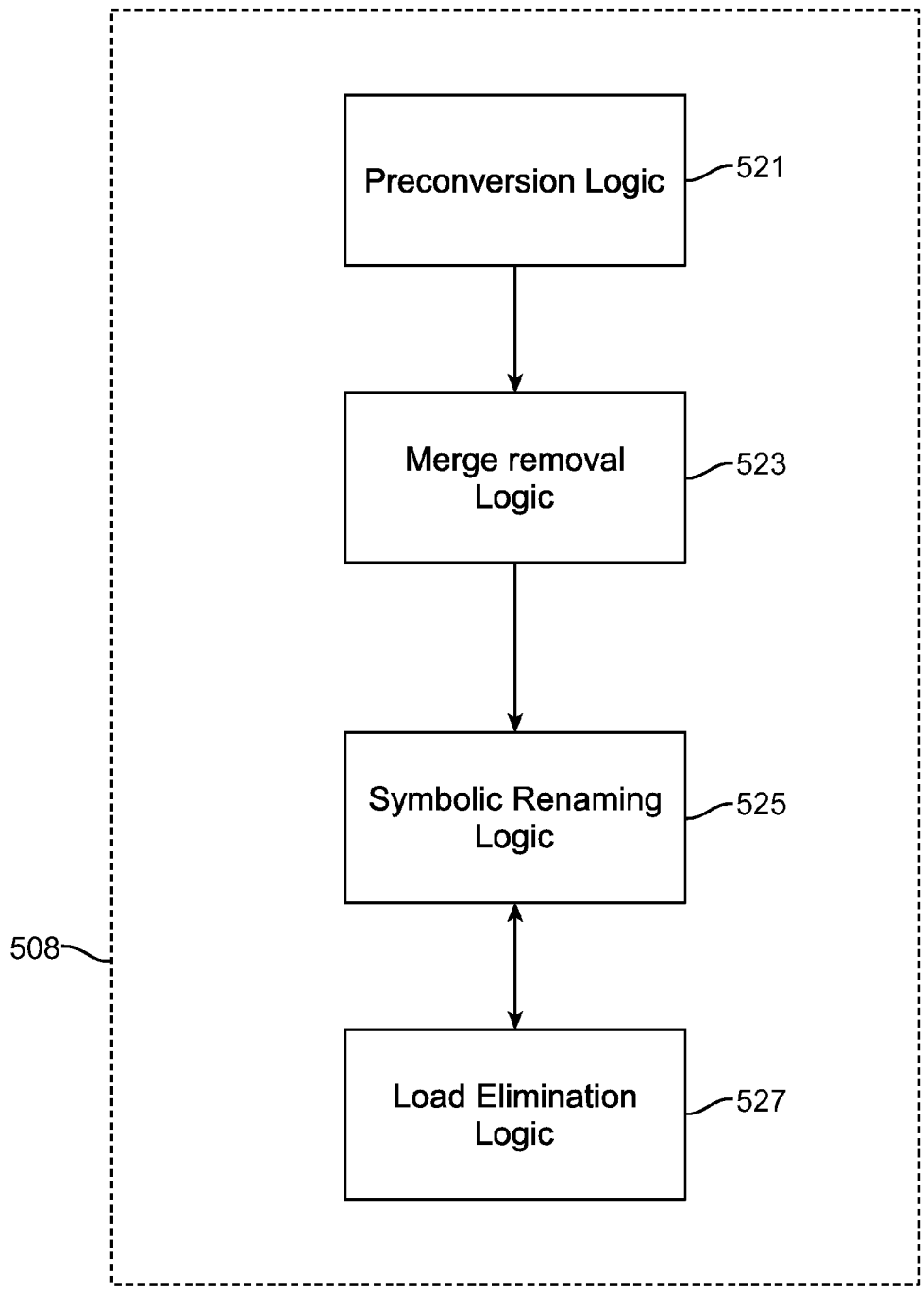
FIG. 15 shows optimization blocks within the optimization control logic 508 of the optimization logic 56, in accordance with an embodiment of the present invention.

FIG. 15 shows optimization blocks within the optimization control logic 508 of the optimization logic 56, in accordance with an embodiment of the present invention. The optimization control logic 508 is shown to be comprised of a preconversion logic 521, a merge removal logic 523, a symbolic renaming logic 525, and a load elimination logic 527.

As shown in FIG. 15, the preconversion logic 521 is shown coupled to the merge removal logic 523, which is, in turn, shown coupled to the symbolic renaming logic 525. The symbolic renaming logic 525 is shown coupled to the load elimination logic 527.

When a working operation (or WorkingOp) is read (or located) by the optimization control logic 508, from the input buffer 54, it is first read and converted through the preconversion logic 521. The preconversion logic 521 fuses operations received with the "fuse_op" bit asserted during pre-optimization with a subsequent operation read from the input buffer 54. Fuse_op bits are stored in the fuse_op vector 144, as shown in FIG. 6.

This fusing of the operation serves to reduce the number of operations emitted to the schedule buffer 58, thereby enhancing processor performance by reducing the number of cycles required by the processor for execution. Additionally, the preconversion logic 521 modifies ("converts" or "updates" or "transforms") the operations in accordance with a set of conversion instructions stored within the preconversion logic 521, as applicable. The conversions performed on the working operation by the preconversion logic 521 are modifications that are independent of other operations, preventing the creation of any new dependencies within the working operation on other operations. For example, the modifications could include converting an "increment" operation to "add," or converting a "decrement" operation to "subtract." Once converted by the preconversion logic 521, the operations are in a canonical form for optimization. Canonical form refers to canonical with respect to the implementation details, i.e. operations with equivalent results are placed in a particular chosen form (rather than a variety of equivalent forms). This results in easier optimization and/or improves optimization because there are fewer forms.

In FIG. 15, the working operation is read by the merge removal logic 523 following the conversion, if any, of the working operation in the preconversion logic 521. The merge removal logic 523 reads the working operation to determine whether or not a "merge" flag may be removed from the current operation. A "merge" flag causes the operation to merge its result with the previous value in its destination register. The removal of the merge flag removes a dependency on the previous value in the destination register. In addition, by removing the need to read the previous value, it may become possible to optimize (symbolically rename) the operation to a more complicated form that reads an additional source register.

The working operation, as optimized by the merge removal logic 523 (or not) and as optimized by the preconversion logic 521 (or not), is read by the symbolic renaming logic 525. The symbolic renaming logic 525 compares the working operation against an optimization rule lookup table (shown as optimization rule lookup table 529 in FIG. 17) in order to optimize the working operation. The optimization rule lookup table is a set of individual optimization rules stored in the optimization control logic 508 containing a list of working operation and source operation patterns corresponding to preset operation transformations, as well as additional limitations to be imposed on the optimizations performed on the working operation. Depending on the outcome of the optimization attempt in the symbolic renaming logic 525, the symbolic renaming logic 525 handles (or processes) the working operation. That is, the working operation may be posted to the register table 510, processed through the load elimination logic 527, or emitted directly to the schedule buffer 58, as discussed in further detail in FIG. 16.

Removing .cc from an operation, during pre-optimization, helps symbolic renaming in two ways. One such way is that the symbolic renaming rules (optimization rules) have fewer limits for working operations that do not produce flags. Therefore, the likelihood of matching a symbolic expression with an optimization rule is increased. Another way is that only an operation that does not produce flags can be posted after symbolic renaming. A flag producer has to be emitted after symbolic renaming, so it can not participate in future symbolic renaming.

The reason that a flag producer type of operation has to be emitted, not posted, results an architectural design.

Briefly, symbolic register renaming (or symbolic renaming) is one of the optimizations performed by the basic block builder 20 and more specifically the optimization logic 56. During the execution of a basic block or trace cache entry, the contents of the architecturally visible registers do not have to be kept consistent with the values they would contain if, an instruction code, such as the X86 code were executed sequentially. All that is important is that by the end of the execution of the basic block trace or trace cache entry the architecturally visible registers must be the same as they would be after all the x86 code was completely executed. Thus, during the execution of a basic block or trace cache entry, temporary values are stored of the architecturally visible registers in other registers—particularly in scratch registers. That is, while the register values of the x86 registers are maintained across traces, the scratch register values are not, they are reset (or set equal to themselves) in the beginning of the trace. The symbolic renaming scheme of the various embodiments of the present invention, involves keeping a rename table (or register table 510) during the optimization of a basic block or trace cache entry. This register table indicates which register is currently holding the value of each architecturally visible register. The register table clearly starts off (before generating any code for the basic block or trace cache entry) indicating that each architecturally visible register is, in fact, holding its own contents—the identity mapping. As the optimized operations are issued they will use the register indicated by this register table instead of the architectural register generated in the operation initially.

Referring still to FIG. 15, the load elimination logic 527 reads the working operation following its optimization, if any, from the symbolic renaming logic 525. The load elimination logic 527 determines whether or not the working operation is a "load" operation. A "load" operation is an operation that accesses system memory and is accordingly a slow operation. It is desirable to eliminate, remove, or at least convert the load operation to a faster operation, such as a register operation. The load elimination logic 527 tries to do so, when possible, thereby enhancing processor performance and redirecting the working operation back into the symbolic renaming logic 525 for further optimization, as discussed in detail in FIG. 22. Other than load operations, the load elimination logic 527 also affects store operations and performs other types of optimization.

In alternate embodiments of the invention, the flow of an operation through the optimization control logic 508 may be changed in both order and in logical structure.

FIG. 16 shows the symbolic renaming optimization 520 performed when a working operation is read by the symbolic renaming logic 525 of the optimization control logic 508. A working operation is processed (or handled) by the symbolic renaming logic 525 after the working operation has been processed by the preconversion logic 521 and the merge removal logic 523.

At step 522, after a working operation has been read from the input buffer 54 by the optimization logic 56 and processed through the preconversion logic 521 and the merge removal logic 523, the symbolic renaming logic 525 processes the working operation. Next at 524, a determination is made as to whether or not the working operation conforms to an optimization rule. In this step, the working operation is compared to the symbolic renaming rules, detected in the optimization rule lookup table 529, and stored in the optimization control logic 508. The details of this determination are discussed relative to subsequent figures.

If it is determined that the working operation does not conform to an optimization rule, the process continues to step 526. At step 526, the symbolic renaming logic 525 processes the working operation as well as the source operations of the working operation posted to the register table 510 in order to compare them to the optimization failure emit lookup table 538. The operations are compared to the optimization failure emit lookup table 538 by the symbolic renaming logic 525, and when a rule is found in the optimization failure emit lookup table 538 that fits, the symbolic expression(s) designated in the emit column 570, are emitted to the schedule buffer 58. The source operations emitted from the register table 510 are emitted in accordance with the corresponding entries for the source operation's corresponding register in the emit vector table 512. As the source operation(s) is emitted to the schedule buffer 58, the value for the source operation's register in the emit vector table 512 are subsequently cleared to values of "0," and the register table 510 entry(s) for the source operation(s) is set to an "invalid" setting (I.e. it is set equal to itself) by the optimization control logic 508. The working operation is processed again by the symbolic renaming logic 525 of the optimization control logic 508 for optimization at the determination 524.

If it is determined at 524 that the working operation conforms to an optimization rule from the optimization rule set stored in the symbolic renaming logic 525, at step 668, the optimization rule is applied. Next, at 528, a determination is made as to whether or not the working operation is eligible for posting to the register table 510 ("postable"). Generally, an operation is postable if it fits a format that can be stored in the register table 510. For example, a simple ALU operation (e.g. not a memop) that does not produce or consume flags may be postable. In an alternative embodiment, all operations are to be posted, at the cost of a more complex register table, and additional constraints, to maintain proper flags ordering.

In the various embodiments of the present invention, it is advantageously determined whether the result will be postable before the operation is optimized, solely based on the working operation. If the optimization fails, some sources are emitted and another attempt at optimization is made and that result is then postable.

Referring still to FIG. 16, if, at 528, it is determined that the working operation is postable, the process continues to step 530. At step 530, the optimization control logic 508 posts the working operation and the symbolic expression(s) of at least one of the source registers to the entry in the register table 510 corresponding to the destination register of the working operation. Additionally, the optimization control logic 508 updates the emit vector table 512 for the destination register's entries in the table. More specifically, the row 517 of the emit vector table 512 for the destination register is modified to preserve the program order in which the working operation is emitted from the register table 510 relative to the other entries in the register table 510. Additional rows 517 for other register table 510 entries in the emit vector table 512 may also be updated by the optimization control logic 508 to be compatible with the updated row 517 for the destination register of the working operation. The symbolic renaming process 520 for the working operation would end at step 530.

If it is determined at 528 that the working operation is not postable, a determination must be made at 532 as to whether or not a "load" operation may be eliminated. If it is determined that the load operation cannot be eliminated, the process continues to step 534 where the working operation is emitted from the optimization logic 56 to the schedule buffer 58.

As the working operation is emitted to the schedule buffer 58, the values for the working operation's entry in the emit vector table 512 are subsequently cleared to values of "0," and the register table 510 entry for the working operation is set to an "invalid" setting (i.e. it is set equal to itself) by the optimization control logic 508. In this situation, the symbolic renaming process 520 for the working operation would end at step 534.

If it is determined at 532 that the load operation can be eliminated, the process continues to step 536. At step 536, the load operation in the working operation is converted to a register copy operation (a "copyr operation"). Further details of this are shown and discussed relative to FIG. 21. The optimization control logic 508 converts the working operation into a copyr in order to enhance processing speed as register copy operations are faster to execute than load operations. Once the working operation has been converted by the optimization control logic 508, the working operation is returned to the determination at 524.

While the steps performed in the symbolic renaming process 520 are shown in FIG. 16 and the foregoing discussion is shown to be in sequential order, alternatively, at least some of the optimizations may be performed substantially in parallel.

FIG. 17 shows an optimization rule lookup table 529, which is included in the optimization control logic 508 in an embodiment of the present invention. The optimization rule lookup table 529 is shown to consist of a rule label column 531, a workingop column 533, a src1 column 535, a src2 column 537 a src3 column 539, a result column 541, a limitation column 543, a row 545, a rule label 547, a workingop entry 549, a src1 entry 551, a src2 entry 553, a src3 entry 555, a result entry 557, and a limitation entry 559.

found in result entry 557 even if the working operation matched the pattern found WorkingOp entry 549, src1 entry 551, src2 entry 553, and src3 entry 555. The result column 541 includes updated or applied symbolic expression (or transformed operation). That is, the result column 541 includes the expression of the resulting symbolic expression.

Exemplary contents of the optimization rule lookup table 529 follow:

TABLE 4

| Rule | WorkingOp | Src1 | Src2 | Src3 | Result | Limitations |
|------|-----------|------|------|------|--------|-------------|
| EA | wa.sz W, X | 1a.cz T*H, U | copyr.cz P | | 1a-wa.sz T*H, U, P | A, C, M, N |
| FA | wa.sz W, X | copyc.cz D | copyr.cz P | | wa.sz P, D | |
| HA | addadd.sz W, X, Y | add.cz T*H, D | copyr.cz P | copyc.cz F | addadd.sz T*H, P, D + F | B, H |

As shown in FIG. 17, the optimization rule lookup table 529 is comprised of seven columns, with each column and a corresponding row forming an entry to the table. The rule column 531 is used to store a generic index of rule labels, each corresponding to a single optimization rule in the rule table.

Rule label 547 represents the rule number assigned to the optimization rule stored in row 545 of the optimization rule lookup table 529. The workingop column 533 stores various forms of operations that are likely to be read from the input buffer 504. For example, WorkingOp entry 549 represents a type of operation that may correspond to a working operation in process of being processed by the optimization core logic 508 (current working operation).

In FIG. 17, the src1 column 535 stores operations that are likely to be found posted to the register table 510 entry corresponding to a register that is to be read by the working operation (the "source register") in order to perform an operation on a different register (the "destination register"). For example, src1 entry 551 corresponds to an operation and a corresponding pattern code posted to the register table 510 for a register with a value that would be used in the workingop entry 549 for rule label 547. The src2 column 537 stores exemplary operations and a corresponding pattern code that are likely to be found posted to the register table 510 entry corresponding to a second source register of the working operation required to perform an operation on the destination register. For example, src2 entry 553 corresponds to an operation posted to the register table 510 for a second source register with a value that would be used in the workingop entry 549 for rule entry 547. The src3 column 539 stores operations and a corresponding pattern code that is likely to be found posted to the register table 510 entry corresponding to a third source register of the working operation required to perform an operation on the destination register. For example, src3 entry 555 corresponds to an operation posted to the register table 510 for a third source register with a value that would be used in the workingop entry 549 for rule entry 547.

The result column 557 stores results and a result is a symbolic expression that may have been formed by combining one or more symbolic expressions. More specifically, the result column 557 stores symbolic expressions that correspond to the rule label found in the rule column 531. For example, the result entry 557 is the symbolic expression that the working operation would be transformed into that corresponds to rule label 547 in row 545. The limitation column 543 stores limitation codes that may be used to preclude the use of the symbolic expression found in the result column 541. For example, the limitation entry 559 would, if applicable, prevent the transformation of the working operation In the example of Table 4, the working operation is treated as a fused operation. The first part of the fused operation is "wa", and the second part is "wb." The destination register of the working operation is Z, and the source registers are W, X, and Y. C is a constant used by the working operation. K is a scale factor for W. If K is listed, K can be 1. If K is not listed, the scale factor must be 1. Each source register is read from the register table to get the source expression. Src1's fused operation is "1a1b" with source registers of T, U, V and constant D. Src2 is "2a2b" with source registers P, Q, R and constant E. Src3 is "3a3b" with source registers L, M, N with constant F. Src1 and Src2 can use a scale factor of H or G, respectively. In the table, 1a, 1b, 2a, 2b, 3a, and 3c represent only the add, sub, and, or, and xor operations. If the optimization applies only to a nonfused operation, then the second portion of the operation is implicitly required to be a copy. If the optimization applies only to a copy operation, then it is listed as such explicitly, not via a reference to 1a, 2a, or 3a.

In the example of Table 4, if the working operation is a memop, it is optimized based on its address calculation, e.g. addadd. Its size for optimization purposes is its address size. If the address size is ".p", it size is treated as 8 bytes for the purpose of optimization and constant use. A memop that uses a segment register in place of a register (W) treats the register as being a copyr of the segment register. The optimization is limited as if the memop has a scale factor K!=1. I.e. the segment register cannot be moved out of src1 of the result.

In the example of Table 4, "sz" represents the size of the working operation. "cz" represents a source operation with a compatible size. This means that the data size produced by the source expression is as large or larger than the data size used by the working operation. "az" represents a source operation with any size. "ss" indicates that the optimized result should be the smaller of the working operation size and the source size.

In the example of Table 4, the working operation is allowed to use .cc and/or an assertion condition in all cases except where prohibited by specific limitations. Posted operations never use .cc or an assertion condition. The result op copies its merge bit from the working operation, without regard to the merge status of the posted operations.

In the example of Table 4, limitation (limit) A applies when a fused result has no room for an assertion. Optimization fails if the working operation contains an assertion. Limit B applies when two sources have constants, and any constant (C or D or E or F) is "unsafe" and the working op dsize is 64 bits. Optimization also fails if the working op uses .cc or contains an assertion involving the carry or overflow flags. Limit C applies when the src1 operation (1a) and the working operation (wa) are add/sub, and the working operation uses .cc or contains an assertion involving the carry or overflow flags. Limit H applies when the working op used three source registers (no constant). In that case, the constant for src1 isn't read, and therefore cannot participate in optimization. Limit M applies when the working op uses .mrg, or if the working operation is a ld.mrg, st, or stnt. Limit N prevents optimization when the working operation is a memop and 1a, 1b, or 2a is something other than add or copy.

The optimization rule lookup table 529 is used by the optimization control logic 508 to reduce the number of operations passed to the schedule buffer by identifying patterns of operations and further potentially transforming them into operations that may be executed more efficiently. A working operation is compared by the optimization control logic 508 to each entry in the optimization rule lookup table 529 in sequential order until a match, if any, is found. The symbolic renaming logic 525 compares the working operation against the exemplary working operation in the optimization rule lookup table 529 for an optimization rule. If the working operation matches the exemplary working operation of a specific optimization rule found in the workingop column 533, the symbolic renaming logic 525 reads the pattern codes for each source register of the working operation from the src1 column 535, the src2 column 537, and the src3 column 539. If the pattern codes of the source registers for the working operation match the pattern codes for the source register entries in the optimization rule lookup table for that particular rule, any limitations on the application of the rule as found in the limitation column 543 for that specific rule must also be met. If the limitation is satisfied, the optimization rule is applied to the working operation, thereby transforming the symbolic expression of the working operation (or the working operation) according to the preset exemplary operation found in the result column 541 entry for that particular rule. That is, the symbolic expression of the working operation is folded into any symbolic expressions previously posted to the register table 510 entry for the destination register of the working operation.

It is understood that rules are designed in accordance with the design of a processor and as such, may vary for different processors. Alternatively, rules may be dynamically changed.

In one embodiment of the invention, examples of limitations include, but are not limited to, the lack of space for an assertion in a fused operation, the presence of a "merge" flag in one of the operations, and the working operation using a .cc flag (indicating that status flags are produced during execution). If none of the limitations apply, the working operation is transformed to correspond to the entry in the result column 541. By transforming the working operation, the number of operations is reduced, and some operations are permitted to be executed out of sequential order as a result of the transformation, thereby increasing processor speed. In one embodiment of the present invention, some transformations of a working operation include, but are not limited to, folding constants, fusing operations, and eliminating dead code.

FIG. 18 shows an optimization failure emit lookup table 538, in accordance with an embodiment of the present invention. The optimization failure emit lookup table 538 is shown to consist of a rule column 558, a workingop column 560, a src1 column 562, a src2 column 564, a src3 column 566, an additional conditions column 568, an emit column 570, a row 540, a rule label 542, a workingop entry 544, a src1 entry 546, a src2 entry 548, a src3 entry 550, an additional conditions entry 552, and an emit entry 554. The tables 529 and 538 are maintained in the optimization logic 56.

As shown in FIG. 18, the optimization failure emit lookup table 538 is comprised of seven columns, with each column creating an entry for each row about the columnar intersections within the table. The rule column 558 is used to store a generic index of rule numbers corresponding to a single optimization failure emit rule in the table. For example, rule label 542 represents the rule number assigned to the optimization failure emit rule stored in row 540 of the optimization failure emit lookup table 538. The workingop column 560 stores exemplary forms of operations that may be read from the input buffer 54 and that will not fall within the optimization rules found in the optimization rule lookup table 529. For example, workingop entry 544 represents a type of operation that may correspond to a working operation in the process of being processed by the optimization core logic 508.

In FIG. 18, the src1 column 562 stores exemplary operations (and a corresponding pattern code) that may be found posted to the register table 510 entry corresponding to a source register that is to be read by the working operation in order to perform an operation on the destination register. For example, src1 entry 546 corresponds to an operation posted to the register table 510 for a register with a value that would be used in the workingop entry 544 for rule label 542. The src2 column 564 stores exemplary operations and a corresponding pattern code that are likely to be found posted to the register table 510 entry corresponding to a second source register of the working operation required to perform an operation on the destination register. For example, src2 entry 548 corresponds to an operation posted to the register table 510 for a second source register with a value that would be used in the workingop entry 544 for rule label 542. The src3 column 566 stores exemplary operations and a corresponding pattern code that are likely to be found posted to the register table 510 entry corresponding to a third source register of the working operation required to perform an operation on the destination register. For example, src3 entry 550 corresponds to an operation posted to the register table 510 for a third source register with a value that would be used in the workingop entry 544 for rule label 542.

The additional conditions column 552 stores conditions that must also be satisfied for a particular rule in order for the rule to apply. For example, the additional conditions entry 552 is an additional condition that must be satisfied in order for the optimization failure emit rule numbered in rule label 542 to be applied to the working operation. The emit column 570 indicates which of the source registers' symbolic expressions must be emitted. For example, the emit entry 554 would correspond to at least one of the src1 entry 546, src2 entry 548, and src3 entry 550, thereby causing the optimization control logic 208 to emit the corresponding posted operation(s) from the register table 510 to the schedule buffer 58.

The optimization failure emit lookup table 538 is used by the optimization control logic 508 to emit a source operation(s) of the working operation posted to the register table 510 to the schedule buffer 58 when a working operation fails to correspond to an optimization rule in the optimization rule lookup table 529. The emit of the posted source operation(s) improves the likelihood of the working operation conforming to a rule in the optimization rule lookup table 529 when it is read by the optimization control logic 508 a second time for optimization purposes. When a working operation fails to conform to a rule in the optimization control logic 508, the working operation is compared by the optimization control logic 508 to each entry in the workingop column 560 of the optimization failure emit lookup table 538 to find one or more matches. In order to determine if the working operation matches a rule in the optimization failure emit lookup table 538, the working operation is first compared to the exemplary operations found in the workingop column 560. In so comparing the working operation, the symbolic expressions and pattern codes posted to the register table 510 for each source register required by the working operation are compared to the exemplary operations and pattern codes found in the src1 column 562, src2 column 564, and src3 column 566. Where the operations posted to the register table 510 for all of the source operations match the exemplary operations of the aforementioned columns and the working operation matches the pattern of the exemplary operation in the workingop column 560, the working operation is found to match the rule.

The additional conditions column 568 contains a series of conditions on the application of an emit rule to the working operation, and there are different limitations applied to each rule. In some embodiments of the invention, there are no entries in the additional conditions column 568 for some rows in the optimization failure emit lookup table 538. If none of the additional conditions, if any, apply, the source symbolic expressions indicated by the emit column 570 are emitted to the schedule buffer, thereby improving the chance of optimizing the working operation when it is read by the optimization control logic 508 again for optimization purposes.

While in the foregoing embodiment/method of the present invention, operations are emitted when they match the rules found in the optimization failure emit lookup table 538 (or they do not match an optimization rule), alternatively, they may be emitted based on heuristics, i.e. selected symbolic expressions posed to the register table 510 for the source registers of the working operation are emitted based on age or other types of heuristics. Still alternatively, operations may be emitted based on a new set of rules based on the contents of the source register of the working operation.

FIG. 19 shows the optimization rule lookup table comparison process 604 performed when a working operation is processed by the symbolic renaming logic 525 of the optimization control logic 508 and compared to the optimization rules contained in the optimization rule lookup table 529. A working operation is processed by the symbolic renaming logic 525 after the working operation has been processed by the preconversion logic 521 and the merge removal logic 523.

At step 572 a working operation refers to a source register in a pending operation register table ("PORT," or register table 510) entry, the expression represents the value of the register calculated by operations that have already been processed. The process proceeds to step 574. At step 574, the first source register operand found in the working operation is referred to as a "source register". The process proceeds to 576.

At 576, a determination is made as to whether or not there is consistent precedence in the register precedence matrix ("RPM", or emit vector table 512) between the "Source Register" and the destination register of the working operation. The optimization control logic 508 examines each source register of the working operation to determine whether there is a potentially inconsistent precedence between that source register and the destination register of the working operation. The precedence of the working operation, relative to its source operations, is determined by examining the predecessor and successor operations as determined by the entries in the emit vector table 512 for the working operation's destination register. A "predecessor" operation is an operation that must be emitted from the register table 510 to the schedule buffer 58 prior to emitting the working operation. A predecessor operation will be represented as having a single "1" bit in the emit vector table 512 row 517 entry for the working operation's destination register in the column 519 corresponding to the predecessor operation's destination register. A "successor" operation is an operation that must be emitted from the register table 510 to the schedule buffer 58 after emitting the working operation from the register table 510. A successor operation will be represented in the emit vector table 512 by having a single "1" bit in the emit vector table 512 column 519 entry for the working operation's destination register in the row 517 corresponding to the successor operation's destination register. If any predecessors of the destination register of the working operation are successors of the "source register," the precedence relationship is determined to be inconsistent.

If it is determined at 576 that the procedure does not have consistent precedence in the emit vector table 512 between the "source register" and destination register of the working operation, the process continues to step 578. At step 578, the optimization control logic 508 emits the pending operations for the source registers as may be necessary to avoid inconsistent precedence. The source operations emitted from the register table 510 are emitted in accordance with the corresponding entries for the source operation's corresponding register in the emit vector table 512. As the source operation(s) is emitted to the schedule buffer 58, the value for the source operation's register in the emit vector table 512 are subsequently cleared to values of "0," and the register table 510 entry(s) for the source operation(s) is set to an "invalid" setting (I.e. it is set equal to itself) by the optimization control logic 508. The process continues to step 580.

If it is determined at 576 that the procedure does have consistent precedence in the emit vector table 512 between the "Source Register" and the destination register of the working operation, a determination is made at 580 as to whether or not the "source register" is the last source register of the working operation. If it is determined that the "Source Register" is not the last source register of the working operation, the process continues to step 582. At step 582, the "source register" is set to equal the next source register of the working operation. The process returns to the determination at 576.

If it is determined at 580 that the "source register" is the last source register of the working operation, the process continues to step 584. At step 584, the "source register" is set equal to the first source register of the working operation.

The process continues to 586. At 586, a determination is made as to whether or not the working operation and pending operations in the register table 510 for its source registers match a pattern in the optimization rule lookup table 529. The individual optimization rules in each row 545 of the optimization rule lookup table 529 are compared against the working operation and the source operations posted to the register table 510 against each corresponding entry in the row 545. By example, if the working operation matched the workingop entry 549 and each source register's symbolic expression and pattern code posted to the register table 510 matched each source register entry in the src1 column 535, src2 column 537, and the src3 column 539, as well as falling within the limitations imposed in the limitation column 543 for the particular rule embodied in the row 545, the result entry 557 from the result column 541 would be the resultant transformation of the working operation. Where a match is found in the rule optimization lookup table 529 to the working operation and its associated source operations, the number of resulting operations to be emitted to the schedule buffer 58 is reduced as unnecessary and superfluous operations are eliminated. This results in improved processing performance as fewer operations need to be processed.

If it is determined at 586 that there is not a matching transformation for the working operation and its source operations in the optimization rule lookup table 529, the process continues to step 588. At step 588, the optimization control logic 508 emits the pending operations for the source registers as required by the emit rules. The source operations, emitted from the register table 510, are emitted in accordance with the corresponding entries for the source operation's corresponding register in the emit vector table 512. As the source operation(s) is emitted to the schedule buffer 58, the value for the source operation's register in the emit vector table 512 are subsequently cleared to values of "0," and the register table 510 entry(s) for the source operation(s) is invalidated by setting the entry to an "invalid" setting (i.e. it is set equal to itself) by the optimization control logic 508. The process continues to step 589. At step 589, the precedence information for the "source register," in the emit vector is updated. Next, at step 590, the "source register" is set to represent the next source register of the working operation. Following this change, the process returns to 586. It is noted that at step 589, the dependency is cleared.

Alternatively, the emit logic can perform matching of all of the sources, i.e. perform steps 586 through 590, substantially at the same time.

If it is determined at 586 that there is a matching transformation rule for the working operation and its source operations in the optimization rule lookup table 529, the process continues to step 592. At step 592, the optimization control logic 508 selects the highest-priority matching rule, transforming the symbolic expression of the working operation. Transforming a symbolic expression folds one expression into another. For example, the source expression is folded into the destination expression. Folding serves to advantageously flatten the expression.

In one embodiment of the present invention, the optimization rule lookup table 529 is organized in a hierarchical fashion such that the highest priority rules are at the beginning of the table, thereby improving the speed at which the rules may be prioritized for a working operation. The process continues to step 594. Rule matching (and all of the foregoing steps) can also occur substantially in parallel.

At step 594, the optimization control logic 508 stores the corresponding pending operation to the PORT entry of the destination register. The symbolic expression of the working operation, transformed to match the result entry 557 of the optimization rule lookup table 529 corresponding to the rule that the working operation matched, is posted to the register table 510. The optimization control logic 508 overwrites any existing entry in the register table 510 for the entry corresponding to the destination register. The process continues to step 596 following these actions.

At step 596, the optimization control logic 508 updates the precedence information for the working operation's destination register entry in the emit vector table (or RPM) and sets a new dependency. This dependency is cleared at step 589. The optimization control logic 508 also clears the column 519 in the RPM (or emit vector table) corresponding to the destination register of the working operation, followed by updating the columns 519 for each of the source operations in the RPM. The following logic is applied when the optimization control logic 508 to update the RPM to conform to the modified dependencies:

If the "source register" is invalid, then set the corresponding bit of the destination register's column 519; otherwise copy the source register's column 519 into the destination register's corresponding column 519. The same is done for each column corresponding to the destination register's predecessors. The destination register and its predecessors are constrained to emit before the sources' successors.

The updates to the emit vector table 512 permit the proper emit order of operations posted to the register table 510 with respect to each other such that any dependencies amongst operations are preserved. This ensures that the operations are executed in the correct order, preventing execution errors. At this point, the process continues to 598.

At 598, a determination is made as to whether or not the working operation was the last operation in the input buffer 54. If it is determined that the working operation was the last operation in the input buffer 54, the process proceeds to step 600. At step 600, the register table 510 emits all valid architectural registers at the end of the trace. No scratch registers are emitted at the end of the trace. Alternatively, all valid registers are emitted. Following the emitting of the valid operations posted to the register table 510 to the schedule buffer 54, the optimization control logic 508 sets every entry in the register table 510 as "invalid," thereby clearing the value of the register table 510. In this situation, the optimization rule lookup table comparison process 604 ends at step 600.

If it is determined that the working operation is not the last operation in the input buffer 54, the process continues to step 502. At step 502, the next operation in the input buffer is set as being the working operation, and the process returns to step 574.

As noted above, the register table 510 stores symbolic expression. If a symbolic expression is updated, the register table 510 is also updated. An updated symbolic expression is emitted, or not, when it is identified, if at all, as a symbolic expression that must be emitted prior to the emission of another symbolic expression (emitbefore), if any, in which case the emit vector associated therewith is updated to include the dependencies.

An updated symbolic expression is emitted, or not, when it is identified, if at all, as one that is updated such that it no longer needs to be emitted prior to the other, if any, symbolic expression (emitafter) and the emit vector is updated to remove any such dependencies.

An emitted symbolic expression is invalidated (or cleared) from the register table 510. When a symbolic expression is emitted, any one or more of its operations may be emitted. The updating of symbolic expressions and emitting of any operations thereof may occur in series. Alternatively, the updating and emitting occur substantially in parallel.

FIG. 20 shows the register table emit process 606 performed when one or more valid operations posted to the register table 510 are emitted to the schedule buffer 58.

At 608, a determination is made as to whether or not there are any valid operations in the register table 510, that have not been emitted to the schedule buffer and a desirable subset of which can be emitted. If there are no valid operations in the register table 510 that are a desirable set to be emitted and that have not yet been emitted to the schedule buffer, the register table emit process 606 ends at 608.

However, if it is determined at 608 that there is at least one valid operation (a "pending operation") posted in the register table 510, a determination is made at 610 as to whether or not there are any predecessors in the emit vector table 512 (or RPM) row 517 corresponding to the pending operation's destination register. If it is determined that there are predecessors in the corresponding row of the emit vector table 512, the process continues to step 618. At step 618, the optimization control logic 508 reads the emit vector table 512 to find a predecessor of the register that has no predecessors of its own in the emit vector table 512. Once the optimization control logic 508 finds a predecessor without any predecessors of its own, the process continues to step 620. In step 620, the optimization control logic 508 emits the operation posted to the register table 510 corresponding to the predecessor operation of the pending operation identified by the optimization control logic 508 in step 618. Once the optimization control logic 508 emits the posted operation, the process continues to step 622.

At step 622, the optimization control logic 508 invalidates the entry in the register table 510 for the operation emitted in step 620 by overwriting the entry as "invalid" in the register table 510. Once the optimization control logic 508 invalidates the entry in the register table 510, the process continues to step 624. At step 624, the optimization control logic 508 clears the successor entries in the emit vector table 512 columns 519 for the predecessor identified in step 618 by the optimization control logic 508. After modifying the entries in the column 519 of the predecessor, the operation returns to 610.

If it is instead determined at 610 that there are no predecessors in the emit vector table 512 row 517 corresponding to the pending operation's destination register, the process continues to step 612. At step 612, the optimization control logic 508 emits the pending operation from the register table 510 to the schedule buffer 58. After the optimization control logic 508 emits the pending operation, the process continues to step 614. At 614, the optimization control logic 508 invalidates the entry in the register table 510 for the pending operation by overwriting the entry as "invalid" in the register table 510. Once the optimization control logic 508 invalidates the entry in the register table 510, the process continues to step 616. At step 616, the optimization control logic 508 clears the successor operation entries in the emit vector table 512 columns 519 for the pending operation. In this situation, the register table emit process 606 ends at step 616.

In summary, the operation of emitting a pending operation from the register table 510 is illustrated in the flowchart of FIG. 20, where the first, the optimization logic 56 checks whether there is a valid pending operation for the register. If not, then no operation needs to be emitted. Next, optimization logic 56 checks the register predecessor row to determine whether any pending operations must first be emitted to observe precedence relationships. If there are no predecessors, then the pending operation is emitted and invalidated, and the register successor column is cleared. If one or more predecessors must be emitted, optimization logic 56 selects and emits a predecessor that has no predecessors of its own, as determined by a register that has all bits cleared to 0 in its predecessor row.

After a load operation is optimized and before it is emitted, it may be eliminated and changed to a register operation instead. Specifically, a load operation may be changed to a copyr (register copy) operation if it reads a memory location that was recently stored or loaded. Whether the location was stored or loaded, the value in memory can be found in the previous store or load's destination register, so the working load operation can simply copy the destination register from the register rather than rereading memory, which advantageously enhances performance by being faster to execute. In one embodiment, the copy operation is sent back for further optimizations.

Some examples of load elimination optimization are now presented.

Example 1

Store-Load Bypass

When a load operation from a particular memory location follows a store operation to that same location, the load operation receives data that was written by the store operation. The stored data comes from a register source. It is possible to convert the load operation into a copy register operation from that register into the load destination register. The latency of a copy register operation can be much smaller than a load operation and more power efficient because it does not require accessing the cache or other external memory. An example of this behavior is a push/pop behavior. A code segment may push several variables to a stack, jump into a routine, and pop the variables out again.

| st [rA], rB | // rA is register A and rB is register B |
| ld rC, [rA] | // rC is register C |

A store operation ('st') is followed by a load operation ('ld'). Since both operations address the memory using the same register (rA) and the value in rA is known to be the same for both operations, the load operation can simply copy rB to rC. That is:

st [rA], rB copyr rC, rB

Example 2

Redundant Load Elimination

In the case where two load operations to the same address occur, the second load operation can be changed into a copy register operation from the first Load operation's destination to the second load operation's destination resulting in power saving, latency reduction and higher bandwidth to the cache.

ld rB, [rA]

ld rC, [rA]

A load operation is followed by another load operation. Since both operations address memory using register rA and the value in rA is known to be the same for both operations, the second load operation can simply copy rB to rC. That is:

ld rB, [rA]

copyr rC, rB

In one embodiment of the present invention, load elimination is accomplished using a memop queue. The memop queue holds a record of previously emitted memory operations (memops). The existence of these previous memops (for example, load or store operations) may allow optimizations on following load operations.

Each memop queue entry consists of the following fields:
Valid
Src1 (source register 1)
Src2 (source register 2)
Displacement (32-bit constant)
Dest (destination register)
Dsize (data size: 8/16/32/64 bits).
Asize (address size: 16/32/64 bits).

Scale (Src1 scale factor: x1/2/4/8)

In an exemplary embodiment, the queue has 2 entries in the basic block builder circuit 20 or 6 entries in the multi-block builder circuit 34. The number of entries of the memop queue is a design choice and can be other than the foregoing. In one embodiment, the number of entries of the memop queue does not exceed the number of entries in the input buffer 54.

In some embodiments, there are further restrictions on memops that can be stored in the memop queue. For example, only integer unit load/store operations can be stored or memops that use three source registers are not recorded in the memop queue and are therefore not subject to optimization or only memops that use a naturally aligned displacement (i.e., a displacement is a multiple of the Dsize) are recorded in the memop queue.

In one embodiment, the memop queue is a circular queue. Operations are never popped (or retrieved) from it, but are instead simply overwritten as operations are pushed (or stored) in the queue. Each entry has a valid bit. All entries are invalidated at the start of a trace, and selected entries may be invalidated by memop conflicts.

A memop in the memop queue indicates that the contents for some symbolic memory address are also available in a destination register. This symbolic memory address is generally of the form rA+rB+C (i.e., 2 registers and a constant). If the memop does not use a constant, a '0' is recorded. In this manner, a memop that uses a displacement of '0' can be considered equivalent to a memop that uses mull (read-only register containing a constant '0').

All logical register sources are relative to the most recently emitted value for that source. A newer value may be posted, but that has no bearing on the address calculation performed by a emitted memop.

A memop in the memop queue indicates that the contents for some symbolic memory address are also available in a destination register. The destination register can be a logical register or mull. The destination register is relative to the most recent optimization for that destination (posted or emitted). If a posted op exists, and an eliminated load is posted as a copyr, the copyr should see the posted op as an optimization source. If a posted op exists for the destination register, the posted op must be a copyr (.mrg). The mechanics of the memop queue prevent any other type of operation from being posted with the same destination as a queue entry.

A load operation causes checking of the memop queue for a match. To be a match, the memop queue entry must be valid, and it must have matching field values (dsize, asize, scale, src1, src2, and displacement) as that of the load operation. If a match is found, the load operation is eliminated. In place of the load operation is substituted a copyr (copy register operation). The destination of the copyr is the load's destination. The source of the copyr is usually the destination field of the matching memop.

If the destination field of the matching memop is the same as the load's destination, then the load op may need the result of a previously posted copyr that the load overwrote and invalidated. In that case, the copyr resulting from the load elimination doesn't use the register from the queue as its source. Instead it uses the source (src1) of the posted copyr that was invalidated by the load. This source was read from the register table for the load's destination, as is normally done for each working op (although the src1 field normally only gets used for store optimization).

Load and store operations are pushed to the memop queue. In one embodiment, there is no concept of the queue filling up; the new memop simply overwrites the oldest entry in the queue, whether that entry was valid or invalid. Because the symbolic address is relative to the most recently emitted register values, the symbolic address is pushed to the queue using the postoptimization source registers. If one of its source registers gets a new value posted, the queued memop can still be used for load elimination. However, if one of the source registers get emitted, the symbolic address becomes out of date, and the queued memop can no longer be used for load elimination.

Because the memory data register is relative to the most recently optimized register values, the data register is pushed to the queue using the preoptimization destination field. For a load, preoptimization or postoptimization makes no difference since the destination field never changes during optimization. However, the store's destination can optimize through a posted copyr. In that case, the original destination of the store is what gets posted, not the postoptimized destination. If a load gets eliminated based on the store, then the load's copyr can optimize through the store's copyr. More interesting, however, is if a new value has been posted to the store's postoptimization data register. In that case, we don't want an eliminated load to pick up that new value. That's why we queue the load with its original register, which we know points to the correct original value in the register table.

In some embodiments, multiple entries are not allowed in the memop queue. When a new memop is pushed to the queue, any matching entry (same address, etc.) is invalidated.

However, a store operation that is pushed to the memop queue may disrupt older entries. Specifically, if the store operation overwrites the value at a particular memory location or if it not clear that a store operation overwrites a particular memory location, then the store operation disrupts any entry for that memory location.

A store operation might disrupt an entry if the store operation uses a different src1 field (register or segment) or a different src2 field (register or constant identifier). It also might disrupt an entry if it uses a different scale. In the case of any mismatch of these values, the corresponding entry is invalidated to prevent load elimination when the data may have changed in memory. If the store operation matches the src1, src2, and scale fields of an entry, then it can be determined whether the store modifies the memory accessed by the entry or whether the two operations access nonconflicting regions of memory. A further determination is made as to whether the store operation could alias to the same physical address as an entry. Since physical aliasing can occur with a particular granularity (for example, 4 KB), the store operation disrupts the value for the previous entry if a predetermined number of bits of the displacement field match, and any of the following are detected:

If either the store operation or the entry has a 64 bit dsize field, or
  If either the store operation or the entry has a 32 bit dsize field and displacement bit [2] matches, or
  If either the store operation or the entry has a 16 bit dsize field and displacement bits [2:1] match, or
  If displacement bits [2:0] match.

The above number of bits are used merely as examples. It is understood that other numbers may be employed.

If a store cannot be pushed to the memop queue because it doesn't fit the required format, it still might disrupt previous memop data. Therefore, the builder pessimistically invalidates many memop queue entries. In one embodiment, the store operation cannot be pushed to the memop queue if the store operation has a displacement that is not naturally aligned with the dsize or the store operation is an integer unit store operation.

If a register is modified, then any later memop that uses that register can no longer match a previous memop that used the register. This is true whether the register was used as an address source or as a data register, although with certain differences.

Because the queued symbolic address is relative to the most recently emitted register values, the address becomes out of date if a register that it uses gets emitted. In other words, if a working op or a posted op is emitted, the destination register of that emitted op is compared to all queued source registers. If there is a match, the corresponding queue entry is invalidated.

Because the queued destination register is relative to the most recently optimized register values, the destination register becomes out of date if a register that it uses gets modified in the OPT stage. In other words, if a working op gets posted or emitted, the destination register of that working op is compared to all queued destination registers. If there is a match, the corresponding queue entry is invalidated.

When a load operation modifies a register, it scans the memop queue before invalidating entries based on its register usage. Since the load op is an emitted working op, this means that it scans for potential load elimination before invalidating entries based on a source or destination match. Quite commonly the IU load will read a value into a register that was already there due to an earlier load or store of that same register. This is a case we still want to eliminate the load, and indeed it is safe to do so (possibly with the special handling described in the "eliminating a load" section). Also, if the IU load modifies a register that it also uses as a source, it can still be eliminated prior to invalidating matching sources in the queue.

On the other hand, if an IU load modifies a register that it also uses as a source, that source is no longer available to following loads. Thus, not only does the IU load invalidate all existing memop queue entries that use that register, it itself is not pushed to the queue because it implicitly invalidates itself.

A load operation is normally recorded in the memop queue regardless of whether or not it is eliminated. However, a load operation that modifies one of its own source registers is not pushed to the memop queue. When a load operation is eliminated, the act of pushing the resulting copyr op to the register table would normally cause the load to be invalidated from the memop queue. If a subsequent load is able to chain through the posted copyr, the posted copyr satisfies the invariants required for load elimination. Therefore, optimization of the copyr is recognized for a working load, and it does not invalidate a matching destination from the queue. (It also does not invalidate a matching source, which is acceptable because they would have already been invalidated as the load operation was eliminated.)

FIG. 21 shows a flow chart of the steps performed by the load elimination logic 527. At 628, a determination is made as to whether or not, the working (or "transformed") operation load operation is detected and if so, the process proceeds to the step 630 where "i", which is an index to an entry in a memopqueue, is set equal to one. Next, at 632, a determination is made as to whether the detected load operation at 628 matches a previous load operation from the same memory location and if so, at step 634, the load operation of 628 is advantageously converted to a register copy operation, the execution of which is faster than that of the original load operation. Next, optionally, at step 636, the matching entry in the memop queue is invalidated. Next, at step 638, the load operation is stored (or pushed onto) in the memop queue (table) and at step 640, "i" is set to one.

Memop queue stores previously emitted load and store operations among the operations of a trace being optimized. The number of entries is less than or up to the number of operations in a trace.

Next, at 660, if the working operation has a destination operand (or register) that matches a destination operand in the i entry of the memop queue, the process proceeds to the step 662, where the matching entry is invalidated, at 664, "i" is compared to N, where N is the number of entries in the memop queue, and the process ends if N equals i. Otherwise, the process continues to step 666 where "i" is incremented by and another destination register matching determination is performed at 660 and the process proceeds as discussed above.

If at 632, it is determined that the load does not match an earlier memory operation in the memop queue, the process continues to 642 where "i" is determined to be equal to N or not, and if not, "i" is incremented by one at step 644 and the process proceeds to 632 and continues as stated above. However, if at 642, it is determined that i is equal to N, the process continues to step 638 and proceeds from thereon as discussed above. "i" being equal to N indicates that no load match is found in the memop queue.

If at 628, it is determined that the working operation is not a load operation, it is tested for being a store operation at 646 and if is not, the process proceeds to step 640, otherwise, at step 648, i set to one and next, at 650, a determination is made as to whether or not the store operation of 646 disrupts the memop queue entry i, and if it does, the entry i in the memop queue is invalidated and the process proceeds to 654 where i is checked against N and if they are equal, the process proceeds to 658 where the store operation is stored in the memop queue (table). The memop queue may be any type of memory, such as RAM or cache or others known to those skilled in the art. After step 658, the process continues to step 640.

If at 650, it is determined that store operation does not disrupt the memop queue entry i, the process proceeds to 654 and continues from thereon.

It is noted that while various optimizations, such as merge removal, symbolic renaming and load elimination, are discussed being performed in series, they can nevertheless be processed in parallel.

"Process" as used herein also refers to "handle".

As the optimization logic 56 emits operations in the Optimize phase, it stores auxiliary information with each entry in the schedule buffer 58 to record registers and flags upon which the operation depends. After all operations have been emitted, the optimization logic 56 begins the slot and pack phase.

The slot and pack phase, performed by slot and pack 60, fills operation slots sequentially in the output buffer 62 from operations and constants in the schedule buffer 58. For each slot, the optimization logic 56 determines which operation, if any, to place in the next slot according to the following process:

From the operations that have satisfied all register and flag dependencies
    If an operation is allowed in the current slot and its constant fits in the overhead bytes, then write that operation to the slot;
    Otherwise, if the operation is allowed in the next slot and its constant would not fit in the overhead bytes, then fill the slot with a load-long-constant operation; and fill the next slot with the operation itself;
    Otherwise, fill the slot with a nop.

In a related embodiment to the process described above, the basic block builder circuit 20 records the location of the slot most recently filled with a 'nop'. When a load-long-constant is required, basic block builder circuit 20 replaces the most recent nop, if any, with the load-long-constant operation.

Slot and pack may be overlapped with the optimization phase, which can overlap with the pre-optimization phase. This can improve performance and reduce the schedule buffer 58 storage requirements. For example, the schedule buffer 58 can be limited to store 6 operations, and the slot and pack Logic 60 can operate when the schedule buffer 58 holds 5 or 6 valid operations.

Multi-Block Builder Circuit:

The multi-block builder circuit 34 loads its input buffer 54 with basic block cache and multi-block cache entries that have been selected for promotion; thus, operations in the input buffer 54 are already in the transformed operation (OpT) format. The input buffer 54 has sufficient capacity to store the largest trace, which comprises a pair of MBC entries for a total of 16 OpTs or 48 operations. Multi-block builder circuit 34 is not required to estimate the trace length. In some embodiments, the operation fetcher circuit 28 ensures that no more than a predetermined number of operations (such as 16 OpTs) is provided to the multi-block builder circuit 34 for optimization.

The multi-block builder 34 performs certain transformations on operations from the Input Buffer, emits results of the transformations to the output buffer, appends additional fields necessary to form an MBC entry, and transmits that entry to the multi-block cache 26. In one embodiment, multi-block builder 34 modifies the terminating branch of each concatenated basic block cache or multi-block cache entry to form an interior trace branch. For example, conditional branches would be replaced with an assertion about the condition that the multi-block builder associated with the predicted branch when the trace was formed.

In other embodiments, the multi-block builder 26 can perform various optimizations to reduce the number of operations and latency for the trace. For example, any or all of the transformations described above for the basic block builder 20 to fold constants, fuse operations, eliminate dead code, and eliminate loads can be applied by the multi-block builder 26 to optimize operation sequences across block boundaries.

Other embodiments of the optimize phase are contemplated. For example, when pending operations must be emitted for source registers to identify a matching pattern, it is possible to emit all registers, to select only registers with valid pending operations, to emit registers in sequence, or to select the next register to emit based on priority determined by the mismatched pattern that is closest or most effective. Also, when processing of all WorkingOps has completed, in some usage scenarios, it is possible to avoid emitting pending operations for certain registers, such as registers dedicated to temporary usage within a block. In some embodiments, such as some embodiments relating to an x86 compatible microprocessor, the register table 510 and optimization logic are augmented to handle special cases such as partially overlapping registers and scaled address calculations.

In the basic block builder circuit 20 (BBB) and multi-block builder circuit 26 (MBB) embodiments described above, the same set of optimizations is always performed. The optimization process itself takes some time, and thus if the optimized block or trace is executed infrequently, the effect of analyzing and modifying the block or trace can be an overall reduction in the performance of the microprocessor. Therefore, performance can be improved by performing some or all of the optimizations selectively on blocks or traces that are expected to be frequently executed. For example, loops, which are often executed frequently, can be identified by a backward terminating branch. Alternatively, the decision of which optimizations to perform can be based on the number of times that a basic block cache 22 (BBC) or multi-block cache 24 (MBC) entry has been executed as recorded in the Promotion History Field; for example certain optimizations can be performed when the value stored in the promotion field reaches a predetermined threshold.

In yet other embodiments, in the BBB and MBB embodiments described above, the RPM diagonal entries are omitted. These embodiment can be modified to provide storage bits along the RPM diagonal, so that one of these bits is set to 1 when an operation uses a register as both source and destination. This can simplify the logic that recognizes which source registers are used for a PORT entry. For the optimization procedures described above to operate correctly with this embodiment, these bits along the diagonal are only read for the column vector of successors; when reading the row vector of predecessors, the diagonal entry is always forced to 0 to avoid circular dependencies.

In the basic block builder circuit 20 (BBB) and the multi-block builder circuit 34 (MBB) embodiments described above, certain optimizations can result in a BBC or MBC entry that exceeds the length estimated in the preoptimization phase, potentially resulting in an entry that exceeds the corresponding maximum cache entry size even when a checkpoint is created. This can occur, for example, when the estimated length is near the maximum, and through reordering and transforming operations some constant values no longer fit as estimated. When such a case is detected, an embodiment can apply an "emergency fallback" optimization phase in which operations are emitted in the order they appear in the Input Buffer and without posting to PORT, thereby avoiding any modifications that may have caused the increase in code size beyond the estimate. Such an emergency fallback can be used in an embodiment either with or without the described checkpoint.

Certain advanced optimizations, such as optimizations that use complete flow graphs, may be too expensive or complex to provide effectively in hardware. The embodiments described thus far can be modified to support such complex optimizations by providing paths for microcode or native software executing on the microprocessor to read and write BBC and MBC entries.

While various embodiments have been described with respect to atomic traces, the aforementioned techniques are equally applicable to non-atomic traces and other groups of instructions or operations.

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description and are within the scope of the claims of the issued patent. For example, interconnect and function-unit bit-widths, clock speeds, and the type of technology used are variable according to various embodiments in each component block. Names given to interconnect and logic are merely descriptive, and should not be construed as limiting the concepts described. The order and arrangement of flowchart and flow diagram process, action, and function elements is variable according to various embodiments. Also, unless specifically stated to the contrary, value ranges specified, maximum and minimum values used, or other particular specifications, are merely those of the described embodiments, are expected to track improvements and changes in implementation technology, and should not be construed as limitations.

Functionally equivalent techniques known in the art are employable instead of those described to implement various components, sub-systems, functions, operations, routines, and sub-routines. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards; number of entries or stages in registers and buffers; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or elements without altering basic cooperation among the remaining elements. It is thus understood that much of the details described are not required to implement various aspects of the embodiments described. To the extent that the remaining elements are distinguishable from the prior art, components and features that are omitted are not limiting on the embodiments described herein.

All such variations in embodiments comprise insubstantial changes over the teachings conveyed by the described embodiments. It is also understood that the embodiments described herein have broad applicability to other computing applications, and are not limited to the particular application or industry of the described embodiments. The invention is thus to be construed as including all possible modifications and variations encompassed within the scope of the claims of the issued patent.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of optimizing a sequence of operations adapted for execution by a processor, where the execution is based in part on a set of condition flags, where some of the operations are of a producer type where execution of such an operation alters at least one of the condition flags, where some of the operations are of a consumer type where a result of the execution of such an operation differs based on a state of at least one of the condition flags, and where the method comprises:
   locating an operation, if any, that is next within the sequence of operations and setting a current operation to be that operation;
   processing the current operation as follows:
   a) de-activating, if not already de-activated, a consumed indicator associated with the current operation;
   b) when the current operation is of the producer type, then activating, if not already activated, a producer indicator associated with the current operation, and locating a first set of operations, if any, that i) are earlier in the sequence of operations than the current operation, ii) have their associated producer indicator activated, and iii) have their associated consumed indicator de-activated, and then de-activating the producer indicator associated with each operation in the first set; and
   c) when the current operation is of the consumer type, then locating a second set of operations, if any, that are earlier in the sequence of operations than the current operation, and then activating, if not already activated, the consumed indicator associated with each operation in the second set; and
   where: some of the operations are of a fusible type where such an operation may be fused with at least one other operation of the fusible type; the locating of the first set and the locating of the second set locate only those operations that are not within an exposed set at the time of the locating; and the processing of the current operation further comprises:
   d) when the current operation is the consumer type and is the fusible type, then locating a particular operation not in the exposed set, if any, that is the most recent occurrence within the sequence of operations of an operation with its producer indicator activated, and then if that particular operation is of the fusible type, then fusing the current operation with that particular operation.

2. The method of claim 1 where: the locating of the first set and the locating of the second set locate only those operations that are not within a set of exposed operations at the time of the locating.

3. The method of claim 2, where: the method further comprises adding a particular operation to the exposed set anytime after: a) that particular operation is the earliest in the sequence of operations that is not in the exposed set; and b) the producer indicator associated with that particular operation is de-activated, or the consumed indicator associated with that particular operation is activated.

4. The method of claim 2: where the sequence of operations is associated with a trace having a specific number of operations in its sequence of operations; and where the method further comprises when the locating of the next operation detects that there are no further operations in the sequence of operations of a particular trace, then adding any remaining operations to the exposed set.

5. The method of claim 2, further comprising: putting a particular operation into the exposed set after: a) that particular operation is the earliest in the sequence of operations that is not in the exposed set; and b) a performance heuristic indicates that particular operation is to be removed.

6. The method of claim 2, where: the method occurs as a stage in processing the sequence of operations in two or more stages that are overlapped at least in part; and once a particular operation is in the exposed set then that particular operation is available for processing by one or more of the other stages.

7. The method of claim 1, where: the processing of the current operation further comprises: e) when the current operation is of a type for which no further optimizations are possible after fusing, then adding the current operation to the exposed set.

8. The method of claim 1, where: the method occurs as a stage in processing the sequence of operations in two or more stages that are overlapped at least in part; and once a particular operation is in the exposed set then that particular operation is available for processing by one or more of the other stages.

9. The method of claim 1, where some of the operations are of an unsure producer type where it is determined at execution time whether or not the execution of such an operation alters any of the condition flags, and wherein the method further comprises: d) when the current operation is of the unsure producer type, then activating, if not already activated, the producer indicator associated with the current operation and not de-activating the producer indicators of any operations.

10. The method of claim 1, where: the set of flags includes two or more flags that are partitioned into a first flag subset and a second flag subset; each operation has a first producer indicator associated with the first flag subset, and a second producer indicator associated with the second flag subset; and where the locating of the first set of operations and the locating of the second set of operations only locate operations that match the flag subsets that correspond to the current operation.

11. The method of claim 10 where: the locating of the first set and the locating of the second set locate only those operations that are not within a set of exposed operations at the time of the locating; each operand has a first consumed indicator associated with the first flag subset and a second consumed indicator associated with the second flag subset; and the method further comprises adding a particular operation to the exposed set anytime after:
   a) that particular operation is the earliest in the sequence of operations that is not in the exposed set;
   b) the first producer indicator associated with that particular operation is de-activated or the first consumed indicator associated with that particular operation is activated; and
   c) the second producer indicator associated with that particular operation is de-activated or the second consumed indicator associated with that particular operation is activated.

12. The method of claim 1, where: the operations are adapted to represent a sequence of instructions that are translated into the sequence of operations for execution by a processor; and the instructions are complex instruction set computer (CISC) instructions.

13. The method of claim 1, where: the operations are adapted to represent a sequence of instructions that are translated into the sequence of operations for execution by a processor; and the instructions are reduced instruction set computer (RISC) instructions.

* * * * *